(12) United States Patent
Hiraguchi

(10) Patent No.: US 7,360,734 B2
(45) Date of Patent: Apr. 22, 2008

(54) RECORDING TAPE CARTRIDGE AND PLATE SPRING

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 363 days.

(21) Appl. No.: 11/065,151

(22) Filed: Feb. 25, 2005

(65) Prior Publication Data

US 2005/0184182 A1  Aug. 25, 2005

(30) Foreign Application Priority Data

Feb. 25, 2004  (JP)  ............... 2004-050169

(51) Int. Cl.
*G11B 23/107* (2006.01)
(52) U.S. Cl. .................. 242/338.1; 360/132
(58) Field of Classification Search ........... 242/338, 242/338.1, 343, 343.2, 348, 348.2; 360/132
See application file for complete search history.

(56) References Cited

U.S. PATENT DOCUMENTS

| | | | |
|---|---|---|---|
| 3,920,196 A | 11/1975 | Tucker et al. | |
| 4,014,042 A | 3/1977 | Schoettle et al. | |
| 4,033,523 A | 7/1977 | Roman | |
| 4,210,296 A | 7/1980 | Frechette | |
| 4,742,415 A | 5/1988 | Oishi | |
| 5,435,498 A | 7/1995 | Makino | |
| 5,436,782 A * | 7/1995 | Sieben | 360/132 |
| 5,547,142 A * | 8/1996 | Cheatham et al. | 242/338.1 |
| 5,813,622 A | 9/1998 | Von Alten | |
| 5,901,916 A | 5/1999 | McAllister et al. | |
| 6,234,416 B1 | 5/2001 | Nayak | |
| 6,318,657 B1 | 11/2001 | Nayak | |
| 6,452,747 B1 | 9/2002 | Johnson et al. | |
| 6,572,045 B2 | 6/2003 | Blair et al. | |
| 6,581,866 B2 | 6/2003 | Tsuyuki et al. | |
| 7,040,564 B1 | 5/2006 | Veno et al. | |
| 7,104,486 B2 | 9/2006 | Hiraguchi | |
| 7,159,815 B2 | 1/2007 | Alexander et al. | |
| 2001/0026030 A1 | 10/2001 | Morita et al. | |
| 2002/0141087 A1 | 10/2002 | Hiraguchi et al. | |
| 2003/0142441 A1 | 7/2003 | Morita et al. | |

(Continued)

FOREIGN PATENT DOCUMENTS

EP  0 347 947 A2  12/1989

(Continued)

*Primary Examiner*—William A Rivera
(74) *Attorney, Agent, or Firm*—Sughrue Mion, PLLC

(57) ABSTRACT

A tape cartridge which, in a state in which a reel cannot rotate, restricts movement of a braking member and restricts movement of the reel. In a state in which engaging walls of locking members are engaged with a top edge portion of a reel hub, step portions and the engaging walls abut a top surface of an upper flange and an inner peripheral surface of the reel hub. In this way, when the cartridge is not in use, vertical direction movement of the reel is restricted. Even if impact of a drop or the like is applied to the recording tape cartridge 10, the reel does not rise up. Accordingly, a problem such as the braking member tilting and becoming anchored does not arise. It is also possible to overcome a problem of the upper flange or a lower flange of the reel breaking due to the reel moving within a case when the tape cartridge is dropped.

10 Claims, 24 Drawing Sheets

U.S. PATENT DOCUMENTS

| | | |
|---|---|---|
| 2004/0026550 A1 | 2/2004 | Hiraguchi et al. |
| 2005/0023400 A1 | 2/2005 | Hiraguchi |
| 2005/0184179 A1 | 8/2005 | Hiraguchi |
| 2005/0184180 A1 | 8/2005 | Hiraguchi |
| 2005/0184181 A1 | 8/2005 | Hiraguchi |
| 2005/0211813 A1 | 9/2005 | Hiraguchi |

FOREIGN PATENT DOCUMENTS

| | | |
|---|---|---|
| EP | 0 488 387 A1 | 6/1992 |
| EP | 1 098 321 A1 | 5/2001 |
| EP | 1 569 229 A2 | 8/2005 |
| EP | 1 569 232 A2 | 8/2005 |
| JP | 5-258524 A | 10/1993 |
| JP | 7-161166 A | 6/1995 |
| JP | 11-39833 A | 2/1999 |
| WO | WO 98/44506 A2 | 10/1998 |

\* cited by examiner

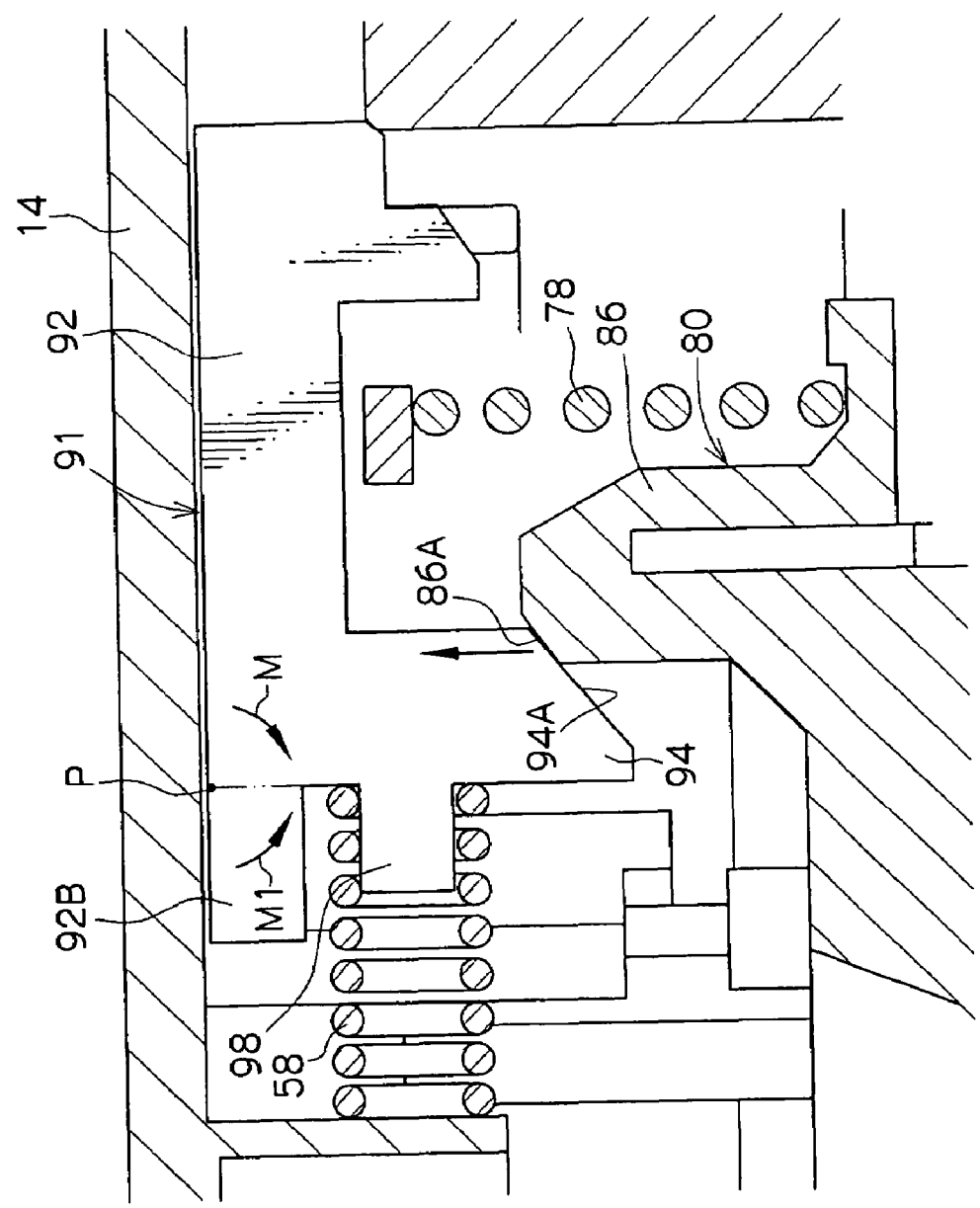

RECORDING TAPE CARTRIDGE AND PLATE SPRING

CROSS-REFERENCE TO RELATED APPLICATION

This application claims priority under 35 USC 119 from Japanese Patent Application No. 2004-50169, the disclosure of which is incorporated by reference herein.

BACKGROUND OF THE INVENTION

1. Field of the Invention

The present invention relates to a recording tape cartridge rotatably accommodating a reel on which is wound a recording tape, such as a magnetic tape or the like, and to a plate spring.

2. Description of the Related Art

Conventionally, recording tape cartridges have been known in which a recording tape, such as a magnetic tape or the like, which is used as a data recording/playback medium for computers or the like, is wound on a single reel, and the reel is rotatably accommodated within a case formed of a synthetic resin. When the recording tape cartridge is in use (is loaded in a drive device), the reel of the recording tape cartridge can rotate within the case. When the recording tape cartridge is not in use (is not loaded in a drive device), the reel is locked so as to be unable to rotate within the case.

Namely, the recording tape cartridge has a braking means in order for the reel to not rotate within the case when the recording tape cartridge is not in use. For example, a structure which makes a braking member, which cannot rotate with respect to the case, engage with the reel, or the like, can be thought of as the braking means.

For example, as shown in FIG. 24, a braking member 130 is formed in the shape of a disc which is accommodated so as to be movable vertically within a reel hub 112, which is shaped as a cylindrical tube having a floor, of a reel 110. A pair of engaging projections 134, which are substantially U-shaped as seen in plan view, stand erect at the top surface of the braking member 130. A pair of rotation restricting ribs 126, which are provided so as to extend downward from the inner surface of an upper case 122, are inserted in the engaging projections 134, such that the braking member 130 cannot rotate with respect to the case 120.

The braking member 130 is usually urged toward a floor wall 114 of the reel hub 112 by an urging means such as a compression coil spring 116 or the like, and makes an annular braking gear 132, which is formed at the bottom surface of the braking member 130, mesh with an annular engaging gear 118 which is formed at the top surface of the floor wall 114 of the reel hub 112. Inadvertent rotation of the reel 110 is thereby impeded.

A substantially cylindrical operation projection 136 projects at the axially central portion of the bottom surface of the braking member 130. The operation projection 136 is inserted in a through hole 114A, which is formed in the axially central portion of the floor wall 114 of the reel hub 112, and faces a gear opening 128 formed in a substantially central portion of a lower case 124. Accordingly, when the reel 110 is to be made rotatable, the operation projection 136 (the braking member 130) is pushed upward, such that the meshing of the braking gear 132 with the engaging gear 118 is cancelled (see, for example, U.S. Pat. No. 6,452,747).

However, in such a structure, when the recording tape cartridge is not in use, the reel 110 can rise upward (movable along the axial direction of the reel 110) against the urging force of the urging means such as the compression coil spring 116 or the like. Therefore, if the user carelessly pushes the floor wall 114 of the reel hub 112 upward due to the impact of a drop or the like, as shown in FIG. 24, the braking member 130 may, in an inclined state, become anchored on the peripheral edge portion of the through hole 114A so as to tilt.

If the recording tape cartridge is loaded into a drive device in this state, not only will recording and playback not be possible, but also, breakage of the recording tape cartridge or malfunctioning of the drive device may be caused. Moreover, there is also the problem that, when the recording tape cartridge is not in use, because the reel can rotate, the recording tape may be adversely affected, such as wrinkles may form in the recording tape or the recording tape may be cut.

SUMMARY OF THE INVENTION

An object of the present invention is to provide a recording tape cartridge in which, when a reel is in a state of being unable to rotate, movement of a braking member is restricted and movement of the reel is restricted.

In order to achieve the above object, in accordance with one aspect of the present invention, there is provided a recording tape cartridge comprising: a case; a reel rotatably accommodated in the case, a recording tape being wound around the reel, the reel having a hub and an engaging portion formed at a floor wall of the hub; a braking member provided so as to face the engaging portion and so as to be movable along an axial direction of the hub, the braking member being able to restrict rotation of the reel by engaging with the engaging portion, and being able to permit the rotation of the reel by canceling a state of engagement with the engaging portion; a part mounting portion formed at the case; a locking member mounted to the part mounting portion so as to be movable in a radial direction of the reel, the locking member restricting axial direction movement of the reel by being interposed between the reel and the case, and permitting movement of the reel by being pushed by the braking member and moving away from the reel; and an urging element urging the locking member in the radial direction of the reel, and interposed between the reel and the case, and restricting the axial direction movement of the reel, wherein convex and concave portions are provided at sliding surfaces of the locking member and the case.

In accordance with another aspect of the present invention, there is provided a recording tape cartridge comprising: a case; a reel rotatably accommodated in the case, a recording tape being wound around the reel, the reel having a hub and an engaging portion formed at a floor wall of the hub; a braking member provided so as to face the engaging portion and so as to be movable along an axial direction of the hub, the braking member being able to restrict rotation of the reel by engaging with the engaging portion, and being able to permit the rotation of the reel by canceling a state of engagement with the engaging portion; a part mounting portion formed at the case; a locking member mounted to the part mounting portion so as to be movable in a radial direction of the reel, the locking member restricting axial direction movement of the reel by being interposed between the reel and the case, and permitting movement of the reel by being pushed by the braking member and moving away from the reel; an urging element urging the locking member in the radial direction of the reel, and interposed between the reel and the case, and restricting the axial direction movement of the reel; and a stabilizing portion jutting out from a corner portion, the stabilizing portion able to generate a rotational moment which opposes a rotational moment which is generated at a corner portion of the locking member by pushing force of the braking member.

In accordance with still another aspect of the present invention, there is provided a recording tape cartridge comprising: a case; a reel rotatably accommodated in the case, a recording tape being wound around the reel, the reel having a hub and an engaging portion formed at a floor wall of the hub; a braking member provided so as to face the engaging portion and so as to be movable along an axial direction of the hub, the braking member being able to restrict rotation of the reel by engaging with the engaging portion, and being able to permit the rotation of the reel by canceling a state of engagement with the engaging portion; a part mounting portion formed at the case; a locking member mounted to the part mounting portion so as to be movable in a radial direction of the reel, the locking member restricting axial direction movement of the reel by being interposed between the reel and the case, and permitting movement of the reel by being pushed by the braking member and moving away from the reel; and an urging element urging the locking member in the radial direction of the reel, and interposed between the reel and the case, and restricting the axial direction movement of the reel, wherein the urging element has a plate spring having a base portion fixed at a center of the part mounting portion, and a leg piece spreading radially from the base portion.

In accordance with yet another aspect of the present invention, there is provided a recording tape cartridge comprising: a case; a reel rotatably accommodated in the case, a recording tape being wound around the reel, the reel having a hub and an engaging portion formed at a floor wall of the hub; a braking member provided so as to face the engaging portion and so as to be movable along an axial direction of the hub, the braking member being able to restrict rotation of the reel by engaging with the engaging portion, and being able to permit the rotation of the reel by canceling a state of engagement with the engaging portion; a part mounting portion formed at the case; a locking member mounted to the part mounting portion so as to be movable in a radial direction of the reel, the locking member restricting axial direction movement of the reel by being interposed between the reel and the case, and permitting movement of the reel by being pushed by the braking member and moving away from the reel; and an urging element urging the locking member in the radial direction of the reel, and interposed between the reel and the case, and restricting the axial direction movement of the reel, wherein the urging element has a plate spring having a base portion fixed at a center of the part mounting portion, and a leg piece spreading radially from the base portion, wherein the locking member has an inclined surface which the leg piece abuts and which is for obtaining a component of force of force which pushes the locking member toward the case and which is generated by the urging force of the plate spring.

In accordance with still yet another aspect of the present invention, there is provided a plate spring machined so as to comprise: a plurality of leg pieces; and a joining portion joining the leg pieces at a center, and causing the leg pieces to extend radially.

Other objects, features and advantages of the present invention will be apparent to those skilled in the art from the explanation of the preferred embodiment of the present invention illustrated in the appended drawings, and from the appended claims.

BRIEF DESCRIPTION OF THE DRAWINGS

FIG. 18 is an explanatory diagram showing a relationship between the braking member and the locking member structuring the recording tape cartridge relating to the embodiment of the present invention.

DETAILED DESCRIPTION OF THE INVENTION

An embodiment of the present invention will be described in detail hereinafter on the basis of the drawings. Note that, for convenience of explanation, the direction of loading a recording tape cartridge into a drive device is denoted by arrow A, and this direction is the front direction. Further, arrow B denotes the leftward direction, and the front, back, left, right, top and bottom will be expressed by using these directions as reference. When the term "radial direction" is used hereinafter, it refers to the direction parallel to a direction heading radially outward from the axially central line of a reel accommodated in a case.

Figure 1:
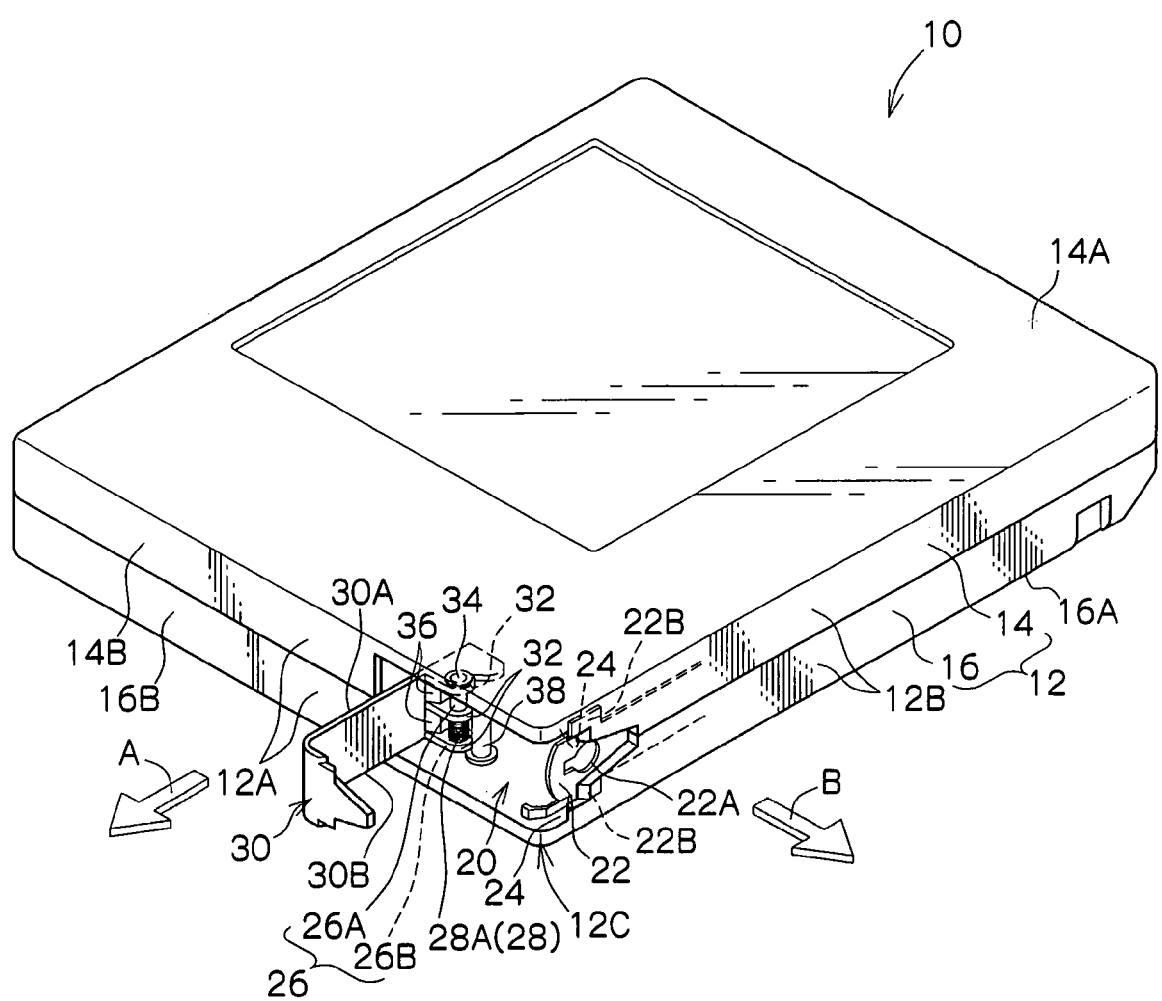
FIG. 1 is a perspective view showing the exterior of a recording tape cartridge relating to an embodiment of the present invention.
Figure 2:
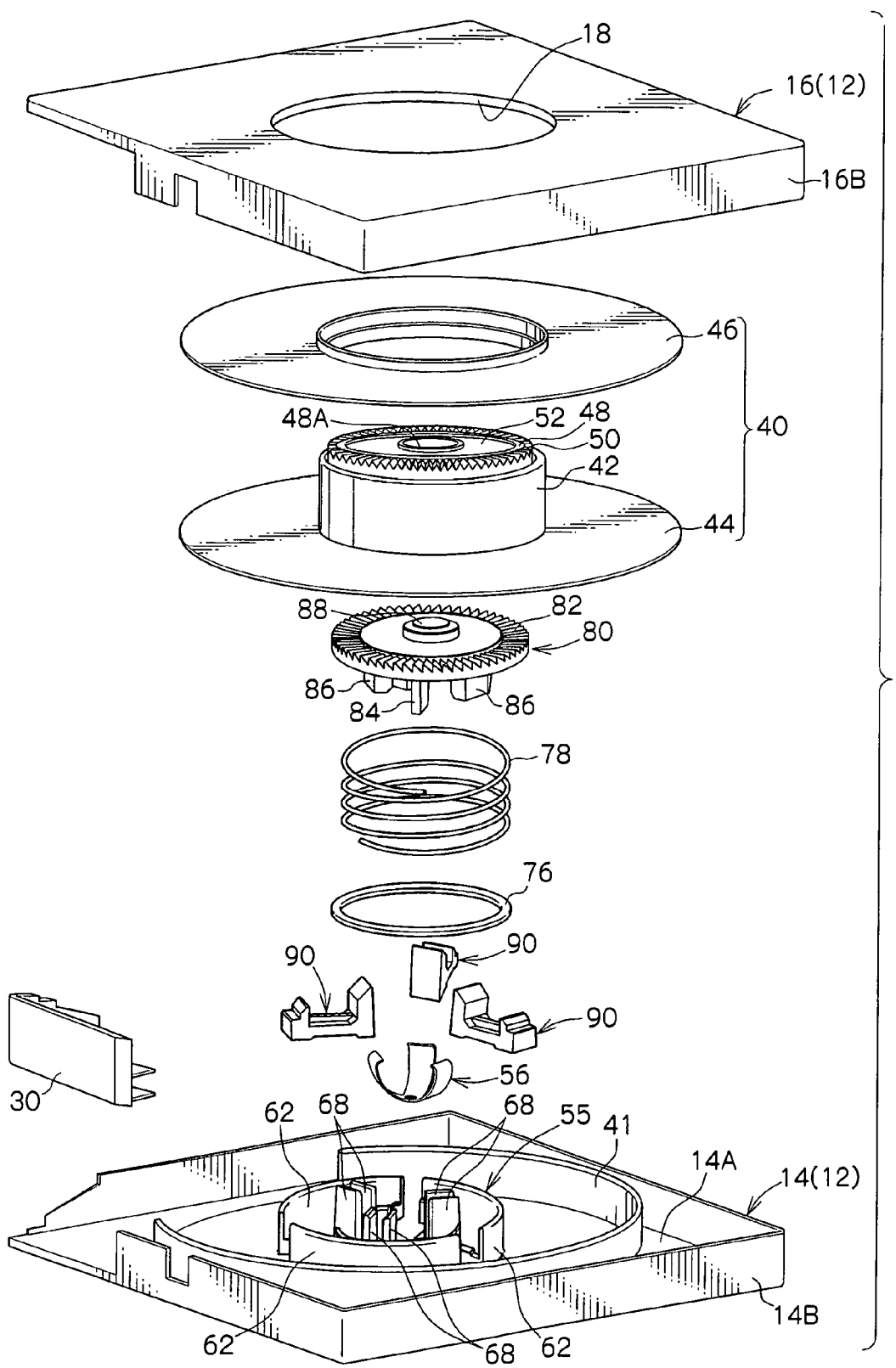
FIG. 2 is an exploded perspective view in a state in which the recording tape cartridge relating to the embodiment of the present invention is turned upside-down.

As shown in FIGS. 1 and 2 (note that FIG. 2 is an exploded perspective view in which a recording tape cartridge 10 is turned upside down), the recording tape cartridge 10 has a case 12 which is formed substantially in the shape of a rectangular box. The case 12 is structured by an upper case 14 and a lower case 16, which are formed of a resin such as PC or the like, being joined together by ultrasonic welding or screws or the like in a state in which a peripheral wall 14B, which stands erect at the peripheral edge of a ceiling plate 14A, and a peripheral wall 16B, which stands erect at the peripheral edge of a floor plate 16A, abut one another.

Figure 3:
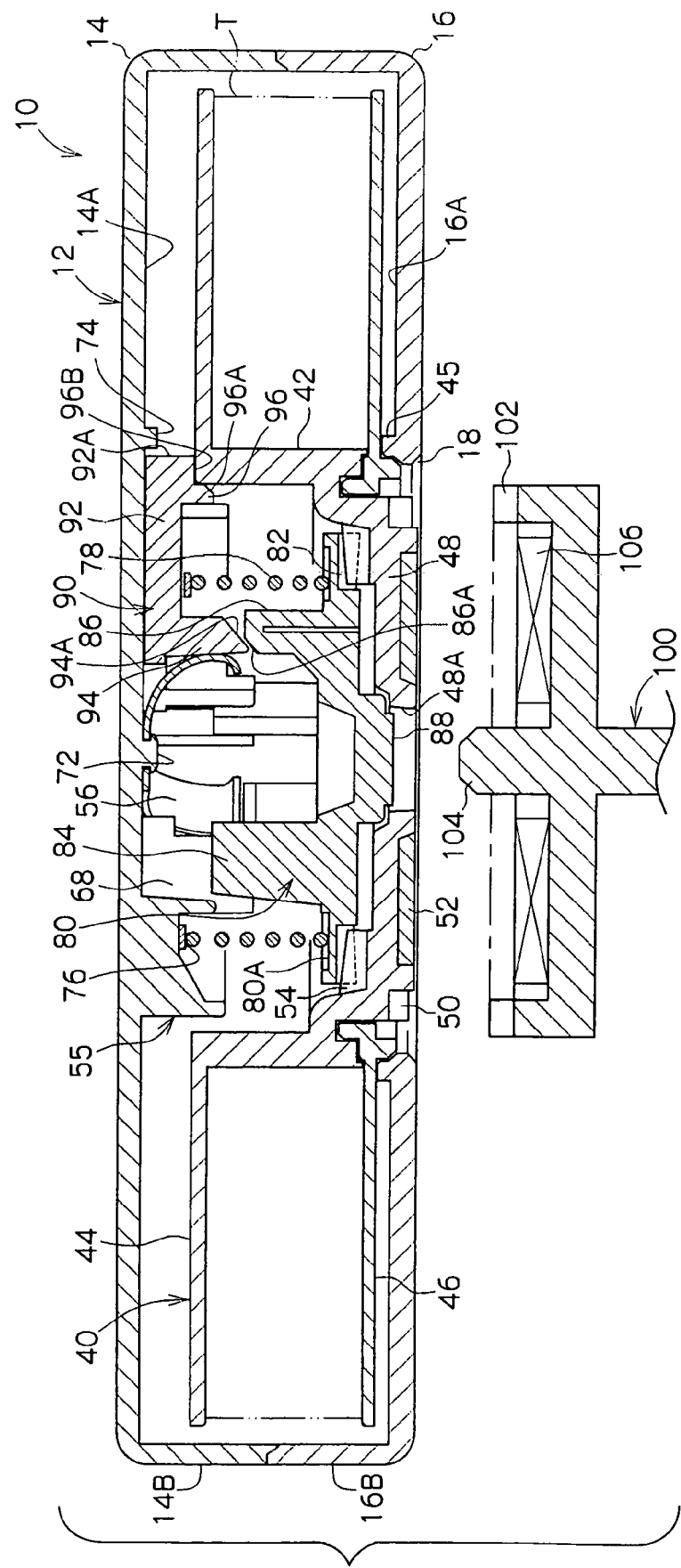
FIG. 3 is a sectional view at a time when rotation of a reel is restricted in the recording tape cartridge relating to the embodiment of the present invention.
Figure 4:
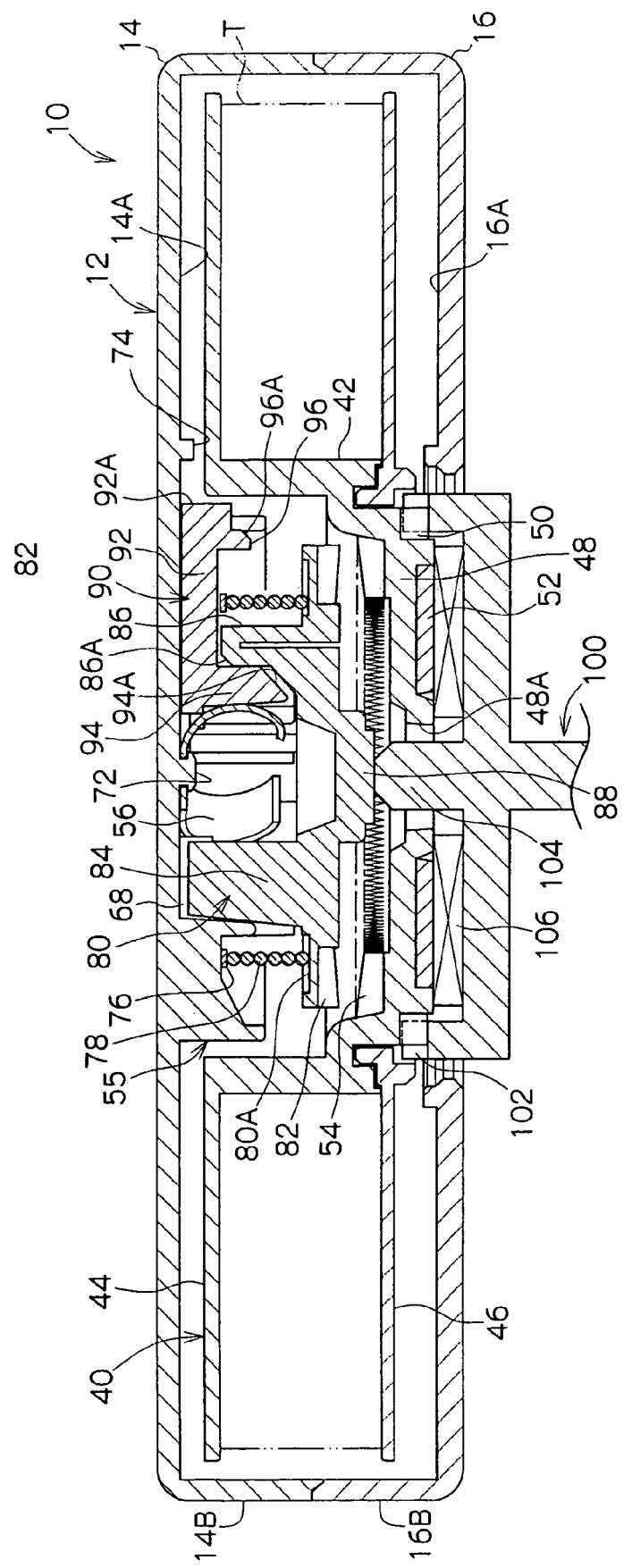
FIG. 4 is a sectional view at a time when rotation of the reel is permitted the recording tape cartridge relating to the embodiment of the present invention.

A single reel 40 is rotatably accommodated within the case 12. As shown in FIGS. 2 through 4, the reel 40 is structured such that a reel hub 42, which is shaped as a cylindrical tube having a floor and which structures the axially central portion of the reel 40, and an upper flange 44, which is provided at the top end portion of the reel hub 42, are formed integrally, and a lower flange 46 is ultrasonically welded to the bottom end portion of the reel hub 42. A recording tape T, such as a magnetic tape or the like, which serves as an information recording/playback medium, is wound around the outer peripheral surface of the reel hub 42. The widthwise direction end portions of the wound recording tape T are held by the upper flange 44 and the lower flange 46.

As shown in FIG. 1, an opening 20, which is for the pulling-out to the exterior of the recording tape T wound on the reel 40, is formed in a vicinity of a front left corner portion 12C of the recording tape cartridge 10. Namely, the opening 20 is formed so as to extend over respective portions of a front wall 12A and a left side wall 12B which are adjacent to the corner portion 12C. A leader tape 22, which is fixed to an end portion of the recording tape T and is disposed along the left side wall 12B, is pulled-out from the opening 20.

Here, "corner portion" means the ridge line portion of intersection at a substantially right angle or an obtuse angle as seen in plan view, at the peripheral walls 14B, 16B of the substantially rectangular box shaped case 12. Accordingly, the corner portion 12C indicates the ridge line portion where the front wall 12A and the left side wall 12B intersect substantially at a right angle as seen in plan view.

The leader tape 22 is a pulled-out member which a pull-out member (not illustrated) of a drive device engages in order to pull-out the recording tape T. A hole 22A, with which the pull-out member engages, is formed in a vicinity of the distal end of the leader tape 22. Jutting portions 22B, which respectively jut-out in the vertical direction, are formed at the top and bottom sides of the leader tape 22 at a region which is slightly more rearward than the distal end of the hole 22A. The leader tape 22 is held within the case 12 due to the jutting portions 22B being accommodated (inserted) in accommodating recesses 24 which are formed in the inner surface of the upper case 14 and the inner surface of the lower case 16, respectively.

When the recording tape cartridge 10 is not in use, the opening 20 is closed by a door 30. The door 30 is formed in a substantial "L" shape as seen in plan view, of substantially the same configuration and size as the opening 20. It is preferable that the door 30 be molded from an olefin resin such as POM or the like. However, the door 30 may be molded from a resin such as PC or the like, or a metal such as SUS or the like.

A supporting shaft 26, which is the fulcrum of rotation of the door 30, projects at the front wall 12A sides of the upper case 14 and the lower case 16, respectively. The upper case 14 side of the supporting shaft 26 is a hollow-cylindrical boss 26A, and the lower case 16 side thereof is a solid-cylindrical boss 26B. The supporting shaft 26 is structured by the distal end (top end) of the boss 26B at the lower case 16 side being fit into the boss 26A at the upper case 14 side. Accordingly, the diameter of the boss 26B is slightly smaller than the diameter of the boss 26A.

Three, flat-plate-shaped rotating sliding portions 32 project in parallel from the inner surface of the door 30 in a vicinity of the right end portion (a position which is offset by a predetermined distance toward the left from the right end portion). These rotating sliding portions 32 respectively project from the top and bottom both end portions of the inner surface of the door 30, and from an intermediate portion which is slightly below the center. Through holes, in which the supporting shaft 26 is fit with play, are formed in the rotating sliding portions 32 respectively. Accordingly, the door 30 is supported rotatably by the supporting shaft 26 being inserted through the through holes.

Annular convex portions 34 are formed around the through holes at the top surface of the rotating sliding portion 32 at the upper end portion, and at the bottom surface of the rotating sliding portion 32 of the lower end portion, respectively. Due to the annular convex portions 34 contacting the upper case 14 and the lower case 16, a clearance of about 0.3 mm to 0.5 mm is formed between a top end surface 30A of the door 30 and the upper case 14, and between a bottom end surface 30B of the door 30 and the lower case 16, respectively.

Projecting portions 36, which are shaped, as seen in plan sectional view, in arc shapes which run along the peripheral surface of the supporting shaft 26, are formed at the inner surface of the door 30 between the rotating sliding portions 32.

The supporting shaft 26 is inserted through a wound portion 28A of a torsion spring 28 which always urges the door 30 in the direction of closing the opening 20. Namely, in the state of being held between the rotating sliding portion 32 at the lower end portion and the rotating sliding portion 32 at the intermediate portion, the wound portion 28A of the torsion spring 28 is fit on and attached to the boss 26B whose diameter is small. One end portion side of the torsion spring 28 is anchored on a screw boss 38 of the case 12 (a screw boss which projects at the lower case 16). The other end portion side of the torsion spring 28 is anchored on the right side edge portion of the projecting portion 36.

The reel 40 is molded of a resin material, and as described above, is structured by the reel hub 42 formed in the shape of a hollow cylinder having a floor, the upper flange 44 extending integrally from the upper end portion of the reel hub 42, and the lower flange 46 mounted by welding or the like to the lower end portion of the reel hub 42. Accordingly, the reel hub 42 and the lower flange 46 are molded by using resin materials which are compatible with one another, and can be easily welded together by ultrasonic waves or the like.

As shown in FIGS. 2 through 4, a floor wall 48 is provided at the lower flange 46 side of the reel hub 42. A through hole 48A is formed in the axially central portion of the floor wall 48. A reel gear 50 is formed in an annular form at the bottom surface side of the floor wall 48. The reel 40 is pushed toward the lower case 16 by the urging force of a compression coil spring 78 which will be described later.

In this state, the reel gear 50 is exposed from a circular gear opening 18 formed in the substantial center of the lower case 16, and meshes with a driving gear 102 provided at a rotating shaft 100 of a drive device, and transmits rotational power to the reel 40.

An annular reel plate 52 formed of a magnetic material is integrally fixed by insert molding or the like at the radial direction inner side of the reel gear 50. In the state in which the driving gear 102 and the reel gear 50 are completely meshed together, the reel plate 52 is attracted by the magnetic force of an annular magnet 106 provided between the driving gear 102 and a releasing projection 104 which will be described later, such that axial offset between the reel 40 and the rotating shaft 100 is prevented, and such that the meshed-together state of the reel gear 50 and the driving gear 102 can be maintained. In accordance with such a structure, when the rotating shaft 100 rotates around its own axis, the reel 40 rotates integrally therewith within the case 12.

Figure 5:
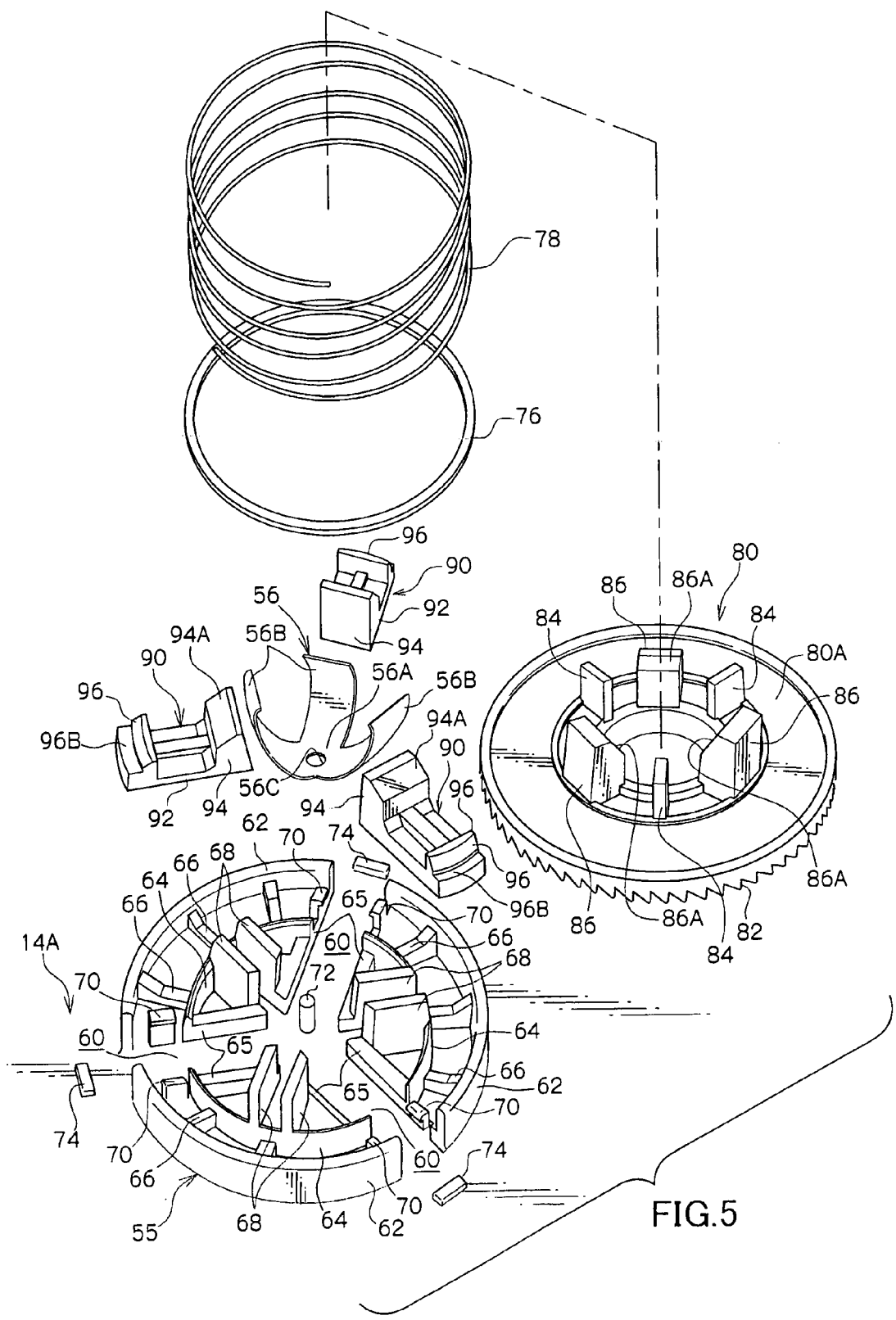
FIG. 5 is an exploded perspective view showing a braking member, parts mounted in a part mounting portion, and the like of the recording tape cartridge relating to the embodiment of the present invention.

An engaging gear 54 is formed in an annular form at the top surface side of the floor wall 48 of the reel hub 42, and can mesh with a braking gear 82 of a braking member 80. As shown in FIGS. 4 and 5, the braking member 80 is formed in the shape of a disc which is accommodated within the reel hub 42 so as to be movable upward and downward. The braking gear 82 is formed in an annular form at the outer peripheral portion of the bottom surface of the braking member 80.

A plurality of (three in the present embodiment) plate-shaped guide portions 84, and a plurality of (three in the present embodiment) substantially rectangular-columnar engaging projections 86 stand erect at the top surface of the braking member 80. Abutment surfaces 86A, whose radial direction inner sides are inclined at a predetermined angle (e.g., 45°), are formed at the engaging projections 86.

A flat surface 80A is formed in an annular form at the top surface of the braking member 80, at the outer side of the guide portions 84 and the engaging projections 86. An operation projection 88, which is substantially solid-cylindrical and which can be inserted through the through hole 48A, projects at the center of the bottom surface of the braking member 80. The operation projection 88 can abut the releasing projection 104 which projects at the axially central portion of the rotating shaft 100 of the drive device (see FIGS. 3 and 4).

As shown in FIGS. 4 and 5, a part mounting portion 55 is provided at the substantial center of the inner surface of the ceiling plate 14A of the upper case 14. Three arc-shaped walls 62 are provided discontinuously at uniform intervals at the part mounting portion 55. Arc-shaped walls 64, whose heights are lower than those of the arc-shaped walls 62, are provided at the inner sides of the arc-shaped walls 62 in states of facing the arc-shaped walls 62. A pair of guide wall portions 68 are provided continuously with the arc-shaped walls 64, at the inner sides of the central portions of the arc-shaped walls 64. The guide wall portions 68 project higher than the arc-shaped walls 62, and are of sizes such that the plate-shaped guide portions 84, which are formed at the top surface of the braking member 80, can be inserted therein.

A plurality of supporting ribs 66 (which will be described later) span radially between the arc-shaped walls 62 and the arc-shaped walls 64, and reinforce the arc-shaped walls 62 and the arc-shaped walls 64. Further, the gap between the arc-shaped walls 62 which are adjacent to one another is substantially the same as the gap between the arc-shaped walls 64 which are adjacent to one another. Accommodating portions 60 are formed by these gaps. Locking members 90 are slidably accommodated in the accommodating portions 60.

Figure 6:
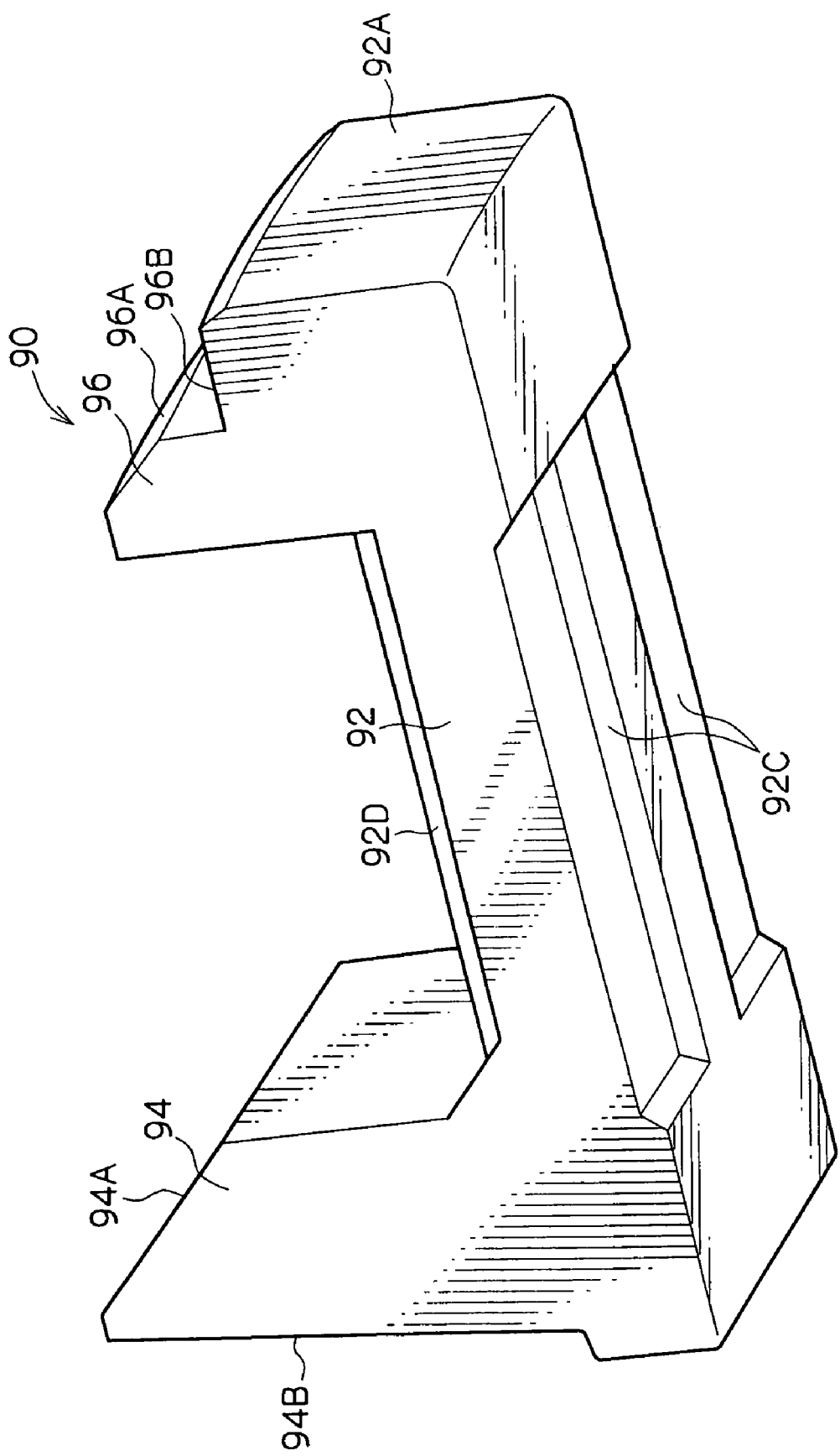
FIG. 6 is a perspective view as seen from a reverse surface side of a locking member structuring the recording tape cartridge relating to the embodiment of the present invention.
Figure 7:
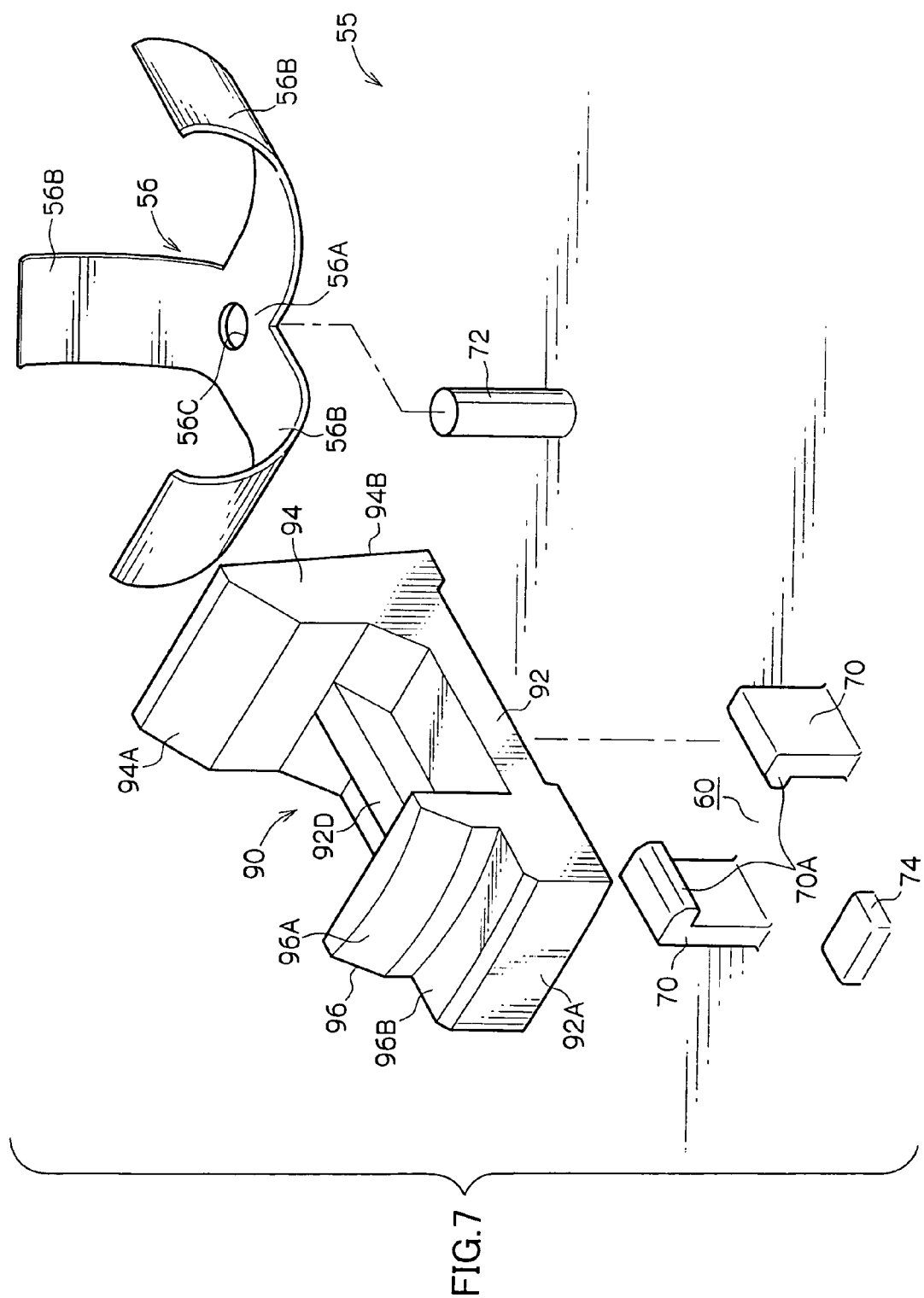
FIG. 7 is an exploded perspective view showing main portions of FIG. 5.

As shown in FIGS. 6 and 7, the locking member 90 has a parallelepiped main body portion 92. A pair of concave portions 92C, which extend along the longitudinal direction of the main body portion 92, are formed in the reverse surface of the main body portion 92 (the surface sliding along the ceiling plate 14A of the upper case 14). Further, a cam portion 94 and an engaging wall 96, whose cross-sections are substantially trapezoidal, project in a state of opposing each other at the obverse of the main body portion 92 (the surface at the side opposite the surface sliding along the ceiling plate 14A of the upper case 14).

An inclined surface 94B is formed at the outer surface of the cam portion 94. Toward the distal end side of the cam portion 94, the inclined surface 94B is inclined slightly inwardly at an angle θ (see FIG. 10). An abutment surface 94A is provided at the inner surface of the distal end side of the cam portion 94. The abutment surface 94A can abut the abutment surface 86A of the substantially rectangular-columnar engaging projection 86 formed on the top surface of the braking member 80 (see FIG. 11B). The abutment surface 94A is inclined at a predetermined angle, and the height thereof gradually decreases in the direction of moving away from the inclined surface 94B side of the cam portion 94.

The engaging wall 96 is shorter than the cam portion 94. The cam portion 94 and the engaging wall 96 are separated from one another by more than at least the distance of separation between the arc-shaped wall 62 and the arc-shaped wall 64. A projecting portion 92D, which is lower than the height of the supporting ribs 66 in the state in which the locking member 90 is accommodated in the accommodating portion 60, spans between the cam portion 94 and the engaging wall 96. The cam portion 94 and the engaging wall 96 are reinforced by the projecting portion 92D.

An abutment surface 96A, which is inclined at a predetermined angle, is formed at the outer surface of the distal end side of the engaging wall 96. The height of the abutment surface 96A decreases along the direction of moving away from the inner surface of the engaging wall 96. The configuration of the outer surface including this abutment surface 96A is an arc-shaped surface which, in plan view, matches the inner peripheral surface of the reel hub 42 (as will be described later).

A step portion 96B juts out from the main body portion 92 at the proximal portion of the outer surface of the engaging wall 96. As shown in FIG. 3, the thickness of the step portion 96B is substantially the same as a gap between the top surface of the upper flange 44 and the inner surface of the ceiling plate 14A in the state in which the lower flange 46 of the reel 40 abuts an annular rib 45 formed at the lower case 16, within the case 12.

The step portion 96B and the engaging wall 96 can abut the top surface of the upper flange 44 of the reel 40 and the inner peripheral surface of the reel hub 42. Movement of the reel 40 is restricted in the state in which the step portion 96B and the engaging wall 96 abut the top surface of the upper flange 44 of the reel 40 and the inner peripheral surface of the reel hub 42 (i.e., in the state in which the locking members 90 are interposed between the inner surface of the ceiling plate 14A of the upper case 14 and the upper flange 44 of the reel 40).

A plate spring 56 can be disposed at the central portion of the part mounting portion 55. As shown in FIGS. 5 and 7, the plate spring 56 is structured by a base portion 56A and leg pieces 56B. A hole 56C is formed in the base portion 56A, and can fit together with a boss 72 provided at the central portion of the part mounting portion 55. The leg pieces 56B spread radially at intervals of 120° from the base portion 56A. Each leg piece 56B is curved, from the base portion 56A to the distal end portion thereof, so as to delineate a large arc.

In the state in which the hole 56C of the plate spring 56 is fit together with the boss 72, the distal end portion of the boss 72 is caulked, such that the plate spring 56 cannot be pulled off of the boss 72. In this state, the leg pieces 56B can abut the inclined surfaces 94B of the cam portions 94 of the locking members 90 which are accommodated in the accommodating portions 60.

Figure 8:
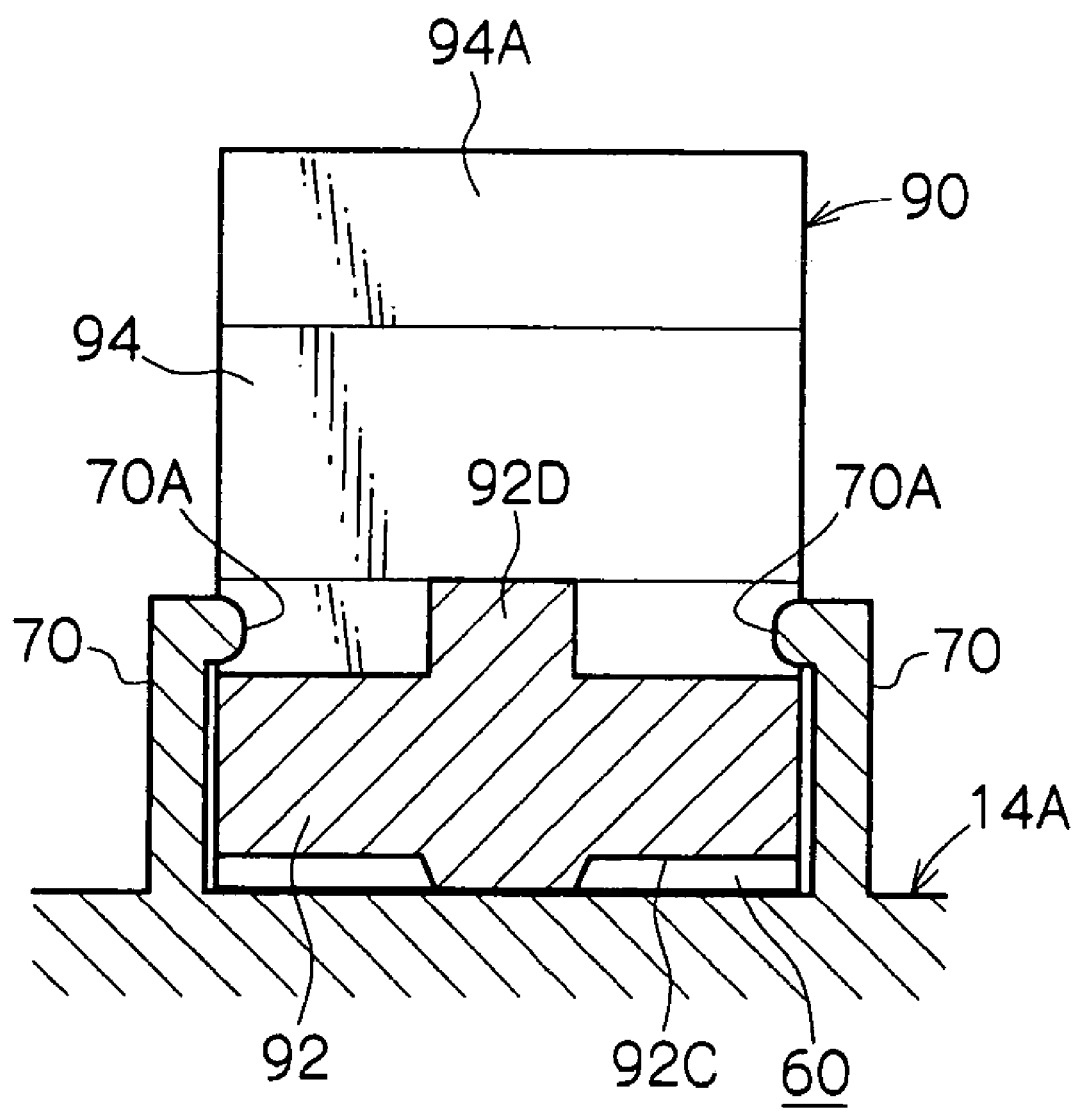
FIG. 8 is a sectional view showing the relationship between holding portions and the locking member structuring the recording tape cartridge relating to the embodiment of the present invention.

Holding portions 70 project on lines connecting the end portions of the arc-shaped walls 62 with the end portions of the arc-shaped walls 64. As shown in FIG. 8, in the state in which the locking member 90 is accommodated in the accommodating portion 60, the holding portions 70 are positioned at the transverse direction left and right of the locking member 90. Undercut portions 70A (amount of projection: approximately 0.3 mm), which are so-called undercut with respect to the direction of removal at the time of removing the upper case 14 from the mold which molds the upper case 14, are formed at the mutually opposing surfaces of the distal end portions of the holding portions 70. The shortest separation distance between the undercut portions 70A is more narrow than the width of the locking member 90.

The holding portions 70 are elastically deformable. Therefore, when the locking member 90 is being made to be accommodated in the accommodating portion 60, the holding portions 70 are moved apart from one another such that undercut portions 70A do not get in the way. When the locking member 90 is accommodated in the accommodating portion 60, the undercut portions 70A hang over the surface of the main body portion 92 of the locking member 90, such that the locking member 90 is provisionally held.

On the other hand, as shown in FIG. 5, side walls 65, which are formed along lines connecting the end portions of the arc-shaped walls 62 with the end portions of the arc-shaped walls 64, span between the end portions of the guide wall portions 68 and the end portions of the arc-shaped walls 64. The side walls 65 reinforce the guide wall portions 68, and, in the state in which the locking members 90 are accommodated in the accommodating portions 60, restrict movement of the locking members 90.

Stopper ribs 74 project at the outer sides of the arc-shaped walls 62, in correspondence with the accommodating portions 60. The locking members 90 can abut the stopper ribs 74. In the state in which the locking members 90 are accommodated in the accommodating portions 60, movement of the locking members 90 is restricted by and the locking members 90 are provisionally held by the stopper ribs 74 (see FIG. 9).

The abutment surfaces 96A of the locking members 90, which are provisionally held by the stopper ribs 74, are arc-shaped surfaces which, in plan view, match the inner peripheral surface of the reel hub 42. Therefore, at the time of assembling the recording tape cartridge 10 (the time of placing the upper case 14 on the lower case 16), accompanying this action, it is easy for the abutment surfaces 96A to engage with the top edge portion of the reel hub 42. As shown in FIG. 3, the abutment surfaces 96A are pressed by the top edge portion of the reel hub 42, and engaging wall 96 side end surfaces 92A of the main body portions 92 move away from the stopper ribs 74.

Figure 9:
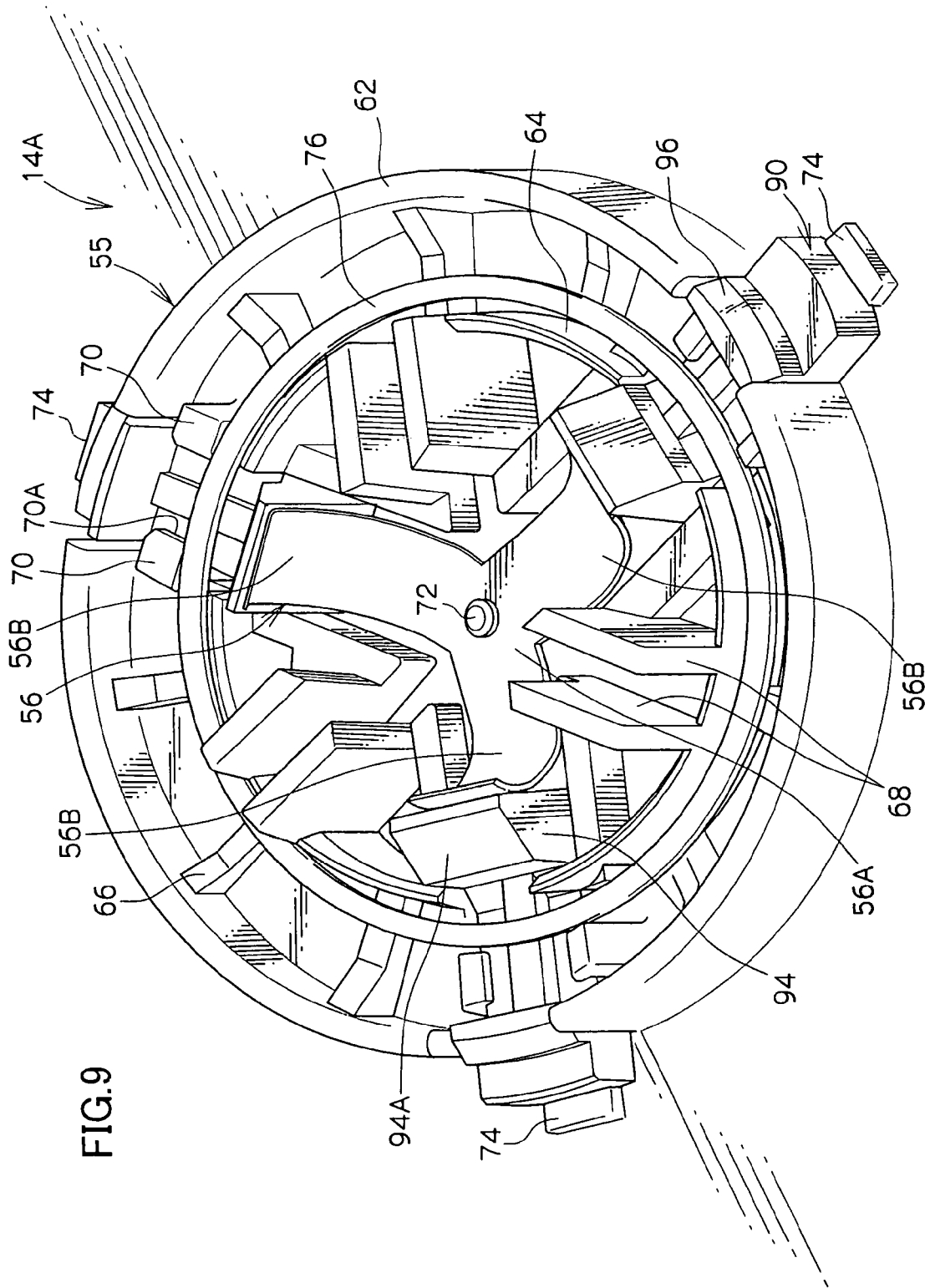
FIG. 9 is a perspective view showing a state in which the respective parts of FIG. 5 are mounted to the part mounting portion.

As shown in FIGS. 5 and 9, an annular stopper 76, which is larger than the outer diameter of the arc-shaped walls 64 and smaller than the inner diameter of the arc-shaped walls 62, can be disposed between the arc-shaped walls 64 and the arc-shaped walls 62. In the state in which the locking members 90 are accommodated in the accommodating portions 60, the stopper 76 is fixed by welding or the like to the supporting ribs 66.

In this way, the locking members 90 are completely prevented from being pulled out. When the upper case 14 is placed on the lower case 16, the locking members 90 do not fall out from the upper case 14. Here, the ability to assemble the plate spring 56 in is good because the plate spring 56 can be mounted even after the stopper 76 is welded on the supporting ribs 66 and the locking members 90 are completely prevented from coming out.

Figure 10:
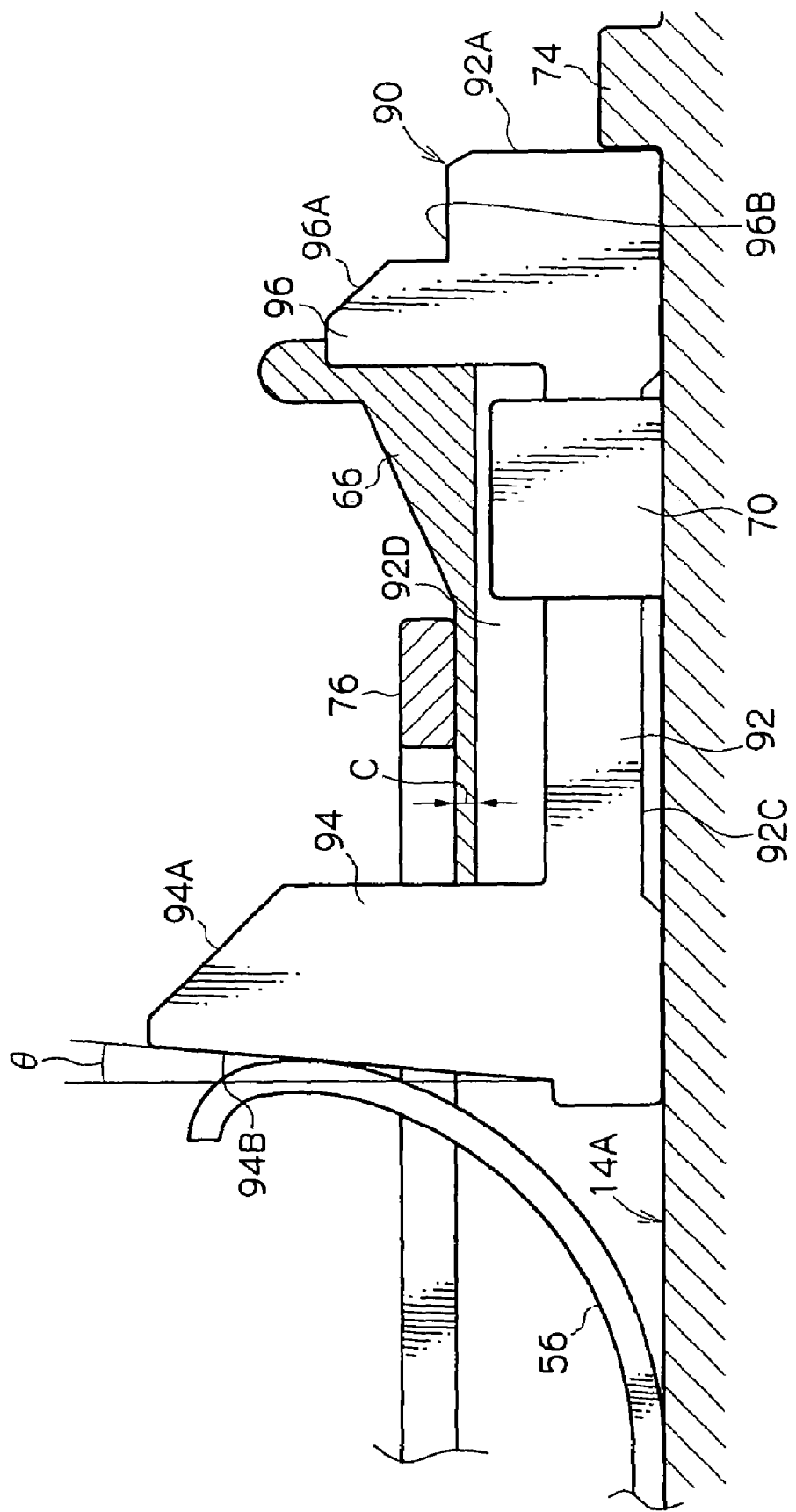
FIG. 10 is a sectional view showing the relationship between a supporting rib and a stopper structuring the recording tape cartridge relating to the embodiment of the present invention.

The projecting portions 92D are lower than the heights of the supporting ribs 66 in the state in which the locking members 90 are accommodated in the accommodating portions 60. Therefore, as shown in FIGS. 9 and 10, in the state in which the stopper 76 is fixed to the supporting ribs 66, a gap C is formed between the stopper 76 and the projecting portions 92D, and the movable state of the locking members 90 is ensured. The stopper 76 also functions to press the locking members 90 at the time when the locking members 90 move within the accommodating portions 60, so as to work toward stability of movement of the locking members 90.

The stopper 76 is for preventing the falling-down or flying-out or the like of the locking members 90. Therefore, the stopper 76 does not necessarily have to be ring-shaped, and may be a plate member spanning over the top surface of the locking member 90. Further, depending on the amount of projection of the undercut portions 70A of the holding portions 70, there are cases in which the locking members 90 can be completely prevented from coming out, and in this case, the stopper 76 or the like is not needed. Moreover, the holding portions 70 do not have to be molded integrally with the upper case 14. Therefore, by fixing the holding portions 70 to the upper case 14 as separate members for preventing the locking members 90 from coming out, the stopper 76 or the like becomes unnecessary.

As shown in FIG. 3, one end portion of the compression coil spring 78 can abut the stopper 76. The other end portion of the compression coil spring 78 abuts the flat surface 80A of the braking member 80. In this way, the reel 40 is urged toward the lower case 16 via the braking member 80.

Figure 11A:
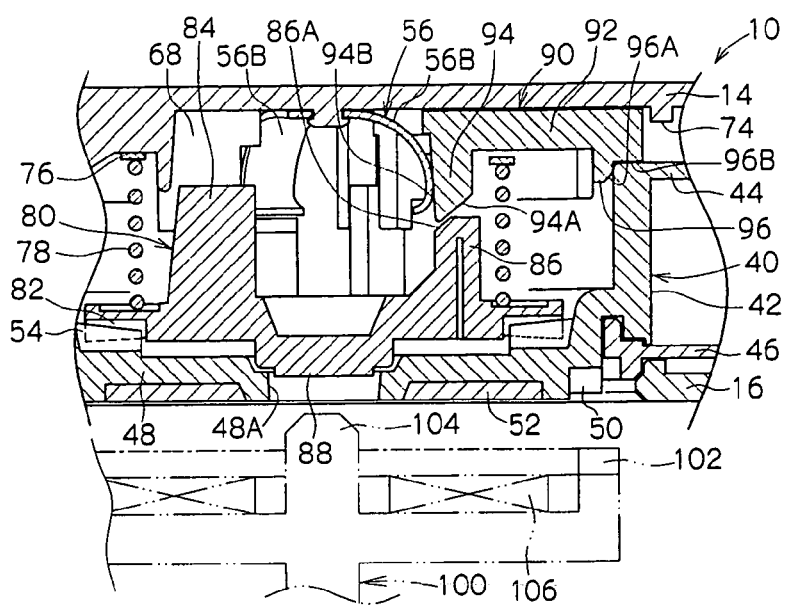
FIGS. 11A through 11C are operational diagrams showing the relationship between a rotating shaft of a drive device and the recording tape cartridge relating to the embodiment of the present invention.

In accordance with the above-described structure, as shown in FIG. 11A, when the recording tape cartridge 10 is not in use, the braking member 80 is urged downward by the urging force of the compression coil spring 78, and the locking members 90 are urged toward the radial direction outer side of the reel 40 by the urging force of the plate spring 56.

At this time, due to the guide portions 84 which are inserted in the guide wall portions 68, rotation of the braking member 80 with respect to the case 12 is impeded, and the engaging gear 54 within the reel hub 42 strongly meshes with the braking gear 82 of the braking member 80. Inadvertent rotation of the reel 40 is thereby impeded.

In the state in which the lower flange 46 of the reel 40 abuts the annular rib 45 formed at the lower case 16, the step portions 96B and engaging walls 96 of the locking members 90 abut the top surface of the upper flange 44 of the reel 40 and the inner peripheral surface of the reel hub 42. Vertical direction movement of the reel 40 is thereby restricted when the recording tape cartridge 10 is not in use.

Figure 11B:
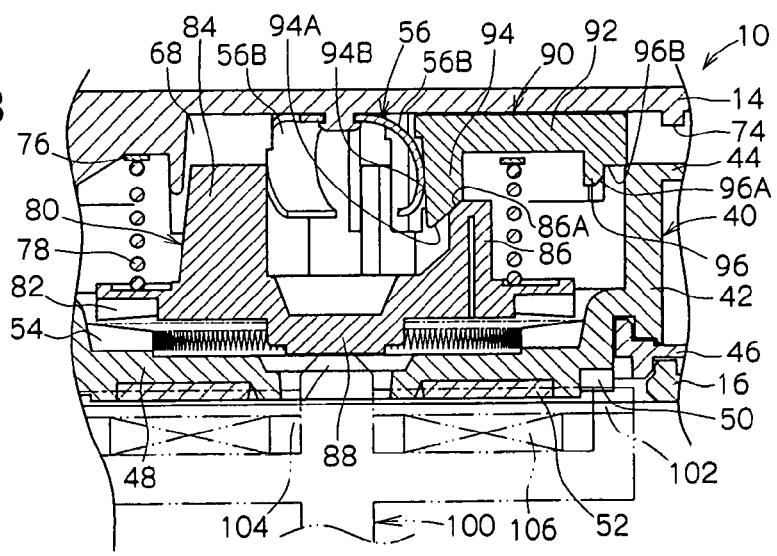

On the other hand, when the recording tape cartridge 10 is used, as shown in FIG. 11B, the engaging projection 104 abuts the operation projection 88, and the braking member 80 rises upward by a predetermined height against the urging force of the compression coil spring 78. In this way, the engaging projections 86 and the cam portions 94 abut one another, and the abutment surfaces 86A of the engaging projections 86 and the abutment surfaces 94A of the cam portions 94 slidingly contact one another.

Here, because the abutment surfaces 94A of the locking members 90 and the abutment surfaces 86A of the engaging projections 86 are inclined, the forces, which are transmitted from the abutment surfaces 86A of the engaging projections 86 and work along the axial direction of the hub 42 of the reel 40, are converted into forces which move the locking members 90 in the horizontal direction. The locking members 90 move inwardly in the radial direction on the upper case 14 against the urging forces of the leg pieces 56B.

Figure 11C:
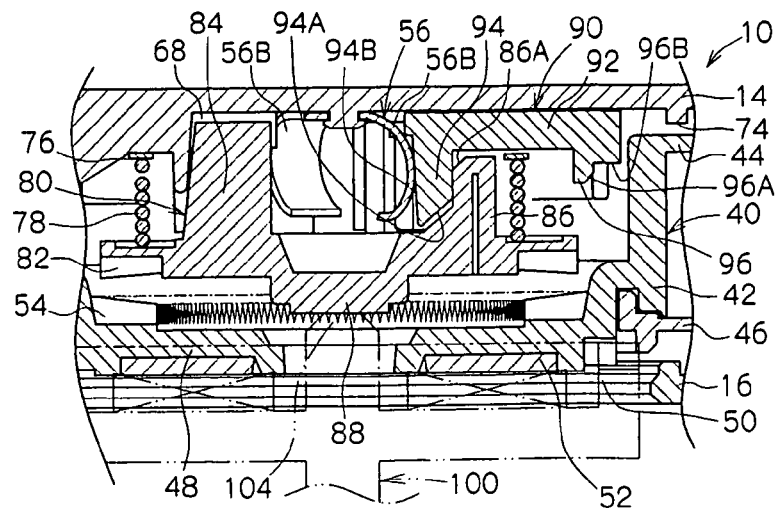

As shown in FIG. 11C, when the cam portions 94 enter in at the inner surface sides of the engaging projections 86, the states of abutment of the cam portions 94 and the engaging projections 86 are cancelled. In this way, the states of engagement between, on the one hand, the locking members 90, and, on the other hand, the braking member 80 and the reel 40, are cancelled. The reel 40 becomes able to rotate and to rise by a predetermined height within the case 12.

Due to the cam portions 94 entering in at the inner surface sides of the engaging projections 86, the pushing forces (urging forces) by which the locking members 90 are pushed by the plate spring 56 are received at the inner surfaces of the engaging projections 86 via the outer surfaces of the cam portions 94. In this way, due to the states of abutment of the abutment surfaces 86A of the engaging projections 86 and the abutment surfaces 94A of the cam portions 94 being cancelled, when the braking member 80 rises up, the pushing force of the plate spring 56 is not transmitted in the vertical direction of the engaging projections 86.

Namely, when the recording tape cartridge 10 is being used, the pushing force of the plate spring 56 acts only in the radial direction (the horizontal direction), and does not act in the up-down direction (the vertical direction). The pushing force in the vertical direction is only the pushing force of the compression coil spring 78. Accordingly, even if the plate spring 56 is provided, the force needed to raise the braking member 80 is not increased.

Next, operation of the recording tape cartridge 10, which is structured as described above, will be described.

As shown in FIG. 1, when the recording tape cartridge 10 is not being used (is not loaded in a drive device), the door 30 closes the opening 20 due to the urging force of the torsion spring 28. Further, the leader tape 22 is disposed along the left side wall 12B due to the jutting portions 22B being accommodated (inserted) and held within the accommodating recesses 24.

When the recording tape cartridge 10 is not in use, as shown in FIGS. 3 and 11A, the braking member 80 is urged downward by the compression coil spring 78. Namely, due to the urging force of the compression coil spring 78, the braking gear 82 of the braking member 80 meshes strongly with the engaging gear 54 in the reel hub 42, such that inadvertent rotation of the reel 40 is impeded.

Due to the urging force of the plate spring 56, the locking members 90 are urged toward the radial direction outer side of the reel 40, the step portions 96B and the engaging walls 96 abut the top surface of the upper flange 44 of the reel 40 and the inner peripheral surface of the reel hub 42 respectively (the engaging walls 96 engage with the top edge portion of the reel hub 42), and vertical direction movement of the reel 40 is restricted.

On the other hand, when data is to be recorded on the recording tape T (see FIG. 3) of the recording tape cartridge 10 shown in FIG. 1, or when data recorded on the recording tape T of the recording tape cartridge 10 is to be played back, the recording tape cartridge 10 is loaded into a drive device (not illustrated). Namely, the recording tape cartridge 10 is inserted, from the front wall 12A side thereof, into a loading opening (not illustrated) of the drive device.

Accompanying this loading, an opening/closing member (not illustrated) of the drive device relatively approaches and abuts the right end portion of the door 30 (at the right side than the supporting shaft 26). When the opening/closing member pushes the right end portion, the door 30 rotates around the supporting shaft 26 against the urging force of the torsion spring 28, such that the opening 20 is opened.

When the door 30 rotates and the opening 20 is opened, a pull-out member (not illustrated) of the drive device approaches the opening 20 from the left side wall 12B side, and engages with the hole 22A of the leader tape 22. At this time, because the leader tape 22 is standing by in a state of being adjacent to the left side wall 12B, the pull-out member can reliably engage the hole 22A.

When the pull-out member engages the hole 22A in this way, due to the pull-out member moving away from the opening 20, the leader tape 22 is pulled-out from the interior of the case 12. Then, the leader tape 22 which has been pulled-out from the interior of the case 12 is wound onto a take-up reel (not illustrated) of the drive device.

Next, as shown in FIGS. 3, 11A, and 11B, the rotating shaft 100 of the drive device enters in from the gear opening 19, and approaches the floor wall 48 of the reel 40. Namely, the releasing projection 104 pushes the operation projection 88, and the brake member 80 rises.

In this way, the meshing-together of the engaging gear 54 and the braking gear 82 is cancelled, and the engaging projections 86 abut the cam portions 94 of the locking members 90 and push the cam portions 94 along the axial direction of the hub 42 of the reel 40. The forces, which are transmitted from the abutment surfaces 86A of the engaging projections 86, are converted into forces which move the locking members 90 in the horizontal direction. Therefore, the locking members 90 move toward the radial direction inner side of the reel 40 on the upper case 14 against the urging force of the plate spring 56.

Namely, as shown in FIGS. 4 and 11C, the outer surface sides of the engaging walls 96 of the locking members 90 move away from the inner peripheral surface of the reel hub 42, and the cam portions 94 enter in (fall in) at the inner sides of the engaging projections 86. In this way, the step portions 96B of the locking members 90 are disposed at the inner side of the reel hub 42, and the engagement of the engaging walls 96 with the top edge portion of the reel hub 42 is released.

In this way, the reel 40 becomes able to rotate and able to rise by a predetermined height within the case 12. Then, due to the rotating shaft 100 rising, the driving gear 102 meshes with the reel gear 50, and the reel plate 52 is attracted by the magnet 106.

When the driving gear 102 meshes with the reel gear 50 in this way, the reel 40 rises by a predetermined height within the case 12 and becomes able to rotate. Due to the driving gear 102, i.e., the reel 40, being driven to rotate synchronously with the take-up reel, the recording tape T is successively fed out to the drive device. Then, recording of data onto the recording tape T or playback of data recorded on the recording tape T is carried out by a recording/playback head (not illustrated) of the drive device.

When the recording tape cartridge 10 is to be removed from the drive device, first, the driving gear 102 is rotated reversely, and the recording tape T is rewound onto the reel 40. Then, the leader tape 22 is disconnected from the take-up reel and is returned to the interior of the case 12 from the opening 20. Namely, the jutting portions 22B of the leader tape 22 are accommodated (inserted) in the accommodating recesses 24, and are held at predetermined positions within the case 12.

Next, as shown in FIG. 11C, FIG. 11B, and FIG. 11A in that order, the rotating shaft 100 moves downward, and the reel 40 moves downward due to the urging force of the compression coil spring 78. In this way, while the abutment surfaces 94A of the cam portions 94 slide on the abutment surfaces 86A of the engaging projections 86, the locking members 90 move outwardly in the radial direction of the reel 40 due to the urging force of the plate spring 56, and the engaging walls 96 engage with the top edge portion of the reel hub 42.

Namely, due to the urging force of the plate spring 56, the step portions 96B and the engaging walls 96 of the locking members 90 abut the top surface of the upper flange 44 of the reel 40 and the inner peripheral surface of the reel hub 42. In this way, when the recording tape cartridge 10 is not in use, vertical direction movement of the reel 40 is restricted.

Further, at this time, due to the urging force of the compression coil spring 78, the braking gear 82 meshes strongly with the engaging gear 54, and inadvertent rotation of the reel 40 is impeded. Then, due to the rotating shaft 100 being pulled-out from the gear opening 18, the magnet 106 moves away from the reel plate 52, and the meshing of the driving gear 102 with the reel gear 50 is cancelled.

Thereafter, the recording tape cartridge 10 is discharged from the loading opening. When the opening/closing member moves away from the right end portion of the door 30 accompanying this discharging operation, the door 30 rotates in the direction opposite to that described above around the supporting shaft 26 due to the urging force of the torsion spring 28, and closes the opening 20.

Next, main portions of the recording tape cartridge relating to the present embodiment will be described.

As shown in FIGS. 3 and 11A, in the state in which the engaging walls 96 of the locking members 90 engage with the top edge portion of the reel hub 42, the step portions 96B and the engaging walls 96 abut the top surface of the upper flange 44 of the reel 40 and the inner peripheral surface of the reel hub 42. In this way, when the recording tape cartridge 10 is not being used, movement of the reel 40 in the vertical direction is restricted.

Therefore, even if impact of a drop or the like is applied to the recording tape cartridge 10, the reel 40 does not rise. Accordingly, the problem of the braking member 80 tilting and falling in does not arise. In addition, it is possible to overcome the problem of, when the recording tape cartridge 10 is dropped, the upper flange 44 or the lower flange 46 provided at the reel 40 breaking due to the reel 40 moving within the case 12.

As shown in FIGS. 2 and 9, the part mounting portion 55 is provided at the central portion of the inner surface of the ceiling plate 14A of the upper case 14. The boss 72 is provided at the central portion of the part mounting portion 55, the plate spring 56 is attached to the boss 72, the leg pieces 56B of the plate spring 56 are made to abut the inclined surfaces 94B of the locking members 90, and the locking members 90 are urged from the central portion of the upper case 14.

In a case in which the plate spring 56 is disposed at the peripheral wall 14B side of the upper case 14 and urges the locking members 90 from the peripheral wall 14B side of the upper case 14, an accommodating rib 41 which accommodates the reel 40, and ribs (not illustrated) for reinforcing the upper case 14, and the like are provided at the peripheral wall 14B side of the upper case 14, and it is difficult to ensure space.

Therefore, by disposing the plate spring 56 at the central portion of the upper case 14 and urging the locking members 90 from the central portion of the upper case 14, space can be easily ensured, and the central portion of the upper case 14 can be utilized effectively.

Further, as shown in FIG. 6, the pair of concave portions 92C, which are provided concavely along the longitudinal direction of the locking member 90, are formed in the reverse surface of the locking member 90 (the surface sliding along the ceiling plate 14A of the upper case 14). In this way, the surface area of sliding between the locking members 90 and the ceiling plate 14A of the upper case 14 (see FIG. 5) can be made to be small. Therefore, the sliding resistance at the time when the locking members 90 slide on the ceiling plate 14A of the upper case 14 can be reduced, and the movement of the locking members 90 can be made to be smooth.

Figure 12:
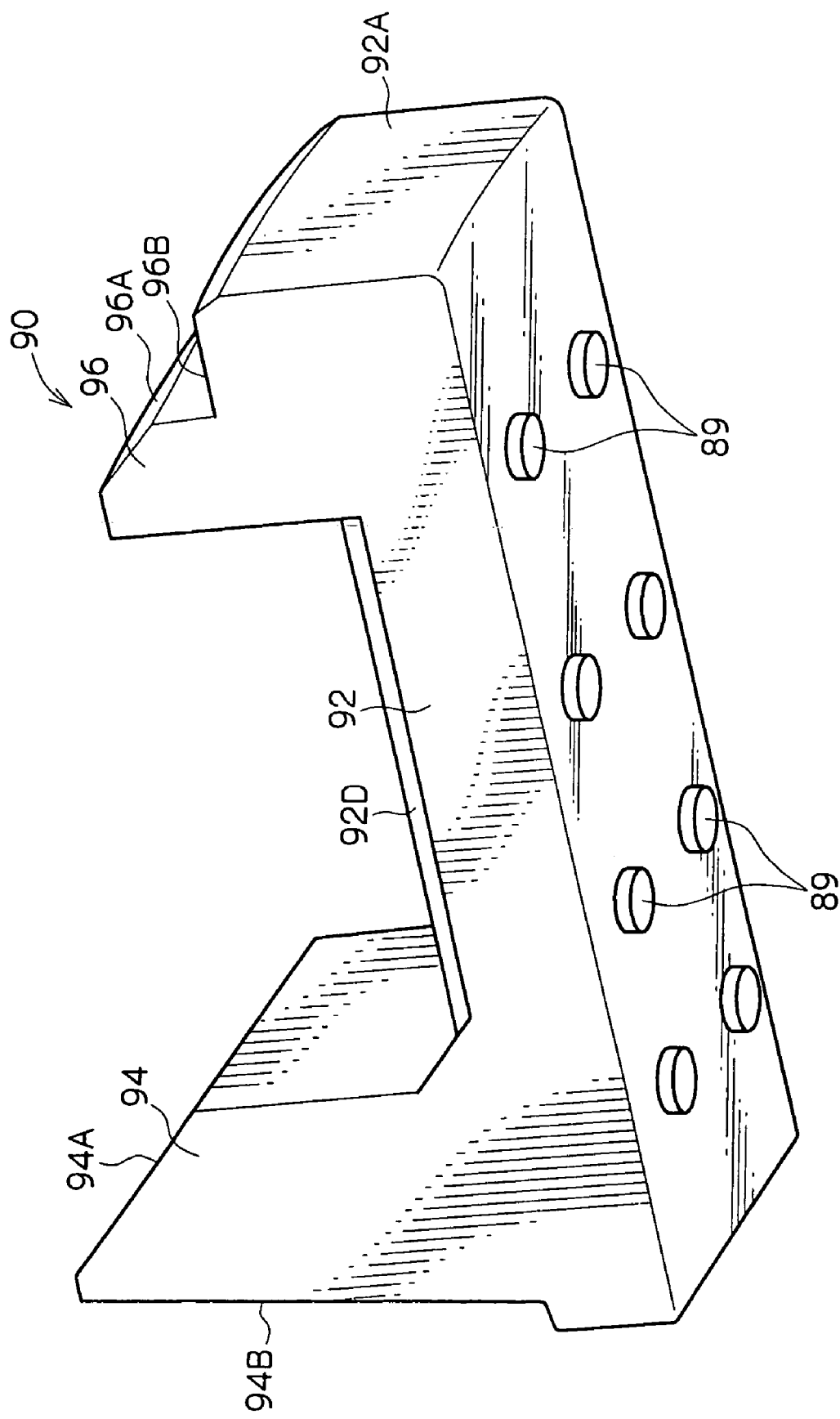
FIG. 12 is a perspective view as seen from a reverse surface side of a modified example of a locking member structuring the recording tape cartridge relating to the embodiment of the present invention.

It suffices to be able to make the surface area of sliding between the locking members 90 and the ceiling plate 14A of the upper case 14 small. Therefore, the present invention is not limited to the above structure, and, for example, convex portions 89 may be formed so as to project at the reverse surfaces of the locking members 90 as shown in FIG. 12. Further, although not illustrated, concave portions or convex portions may be formed at the upper case 14, and the reverse surfaces of the locking members 90 may be subjected to a surface treatment to make the surface roughness thereof small, in order to reduce the sliding resistance between the locking members 90 and the ceiling plate 14A of the upper case 14. Moreover, sliding sheets or the like may be fixed or coated or the like on the reverse surfaces of the locking members 90.

As shown in FIG. 7, the plate spring 56 is structured by the base portion 56A and the leg pieces 56B. By making the leg pieces 56B widen radially from the base portion 56A, the single plate spring 56 suffices regardless of the number of the locking members 90. Therefore, at the time of assembly, it suffices to assemble in the single plate spring 56 regardless of the number of the locking members 90. Thus, assembly is facilitated, and workability improves.

The leg pieces 56B are curved so as to delineate large arcs from the base portion 56A to the distal end portions thereof. The top and bottom directions of the plate spring 56 are thereby made clear. Therefore, there is no concern that the plate spring 56 will be assembled in upside-down.

As shown in FIGS. 9 and 10, in the state in which the plate spring 56 is fit together with the boss 72, the leg pieces 56B abut the cam portions 94 of the locking members 90 and push the locking members 90 horizontally in directions of moving away from the boss 72. The abutment surfaces of the cam portions 94, which abutment surfaces the leg pieces 56B abut, are the inclined surface 94B (angle θ), and are inclined slightly inwardly along the directions toward the end portion sides of the cam portions 94. In this way, components of force Fy, which push the locking members 90 toward the upper case 14, can be generated, and the locking members 90 can be made to not move away from the upper case 14.

Figure 13:
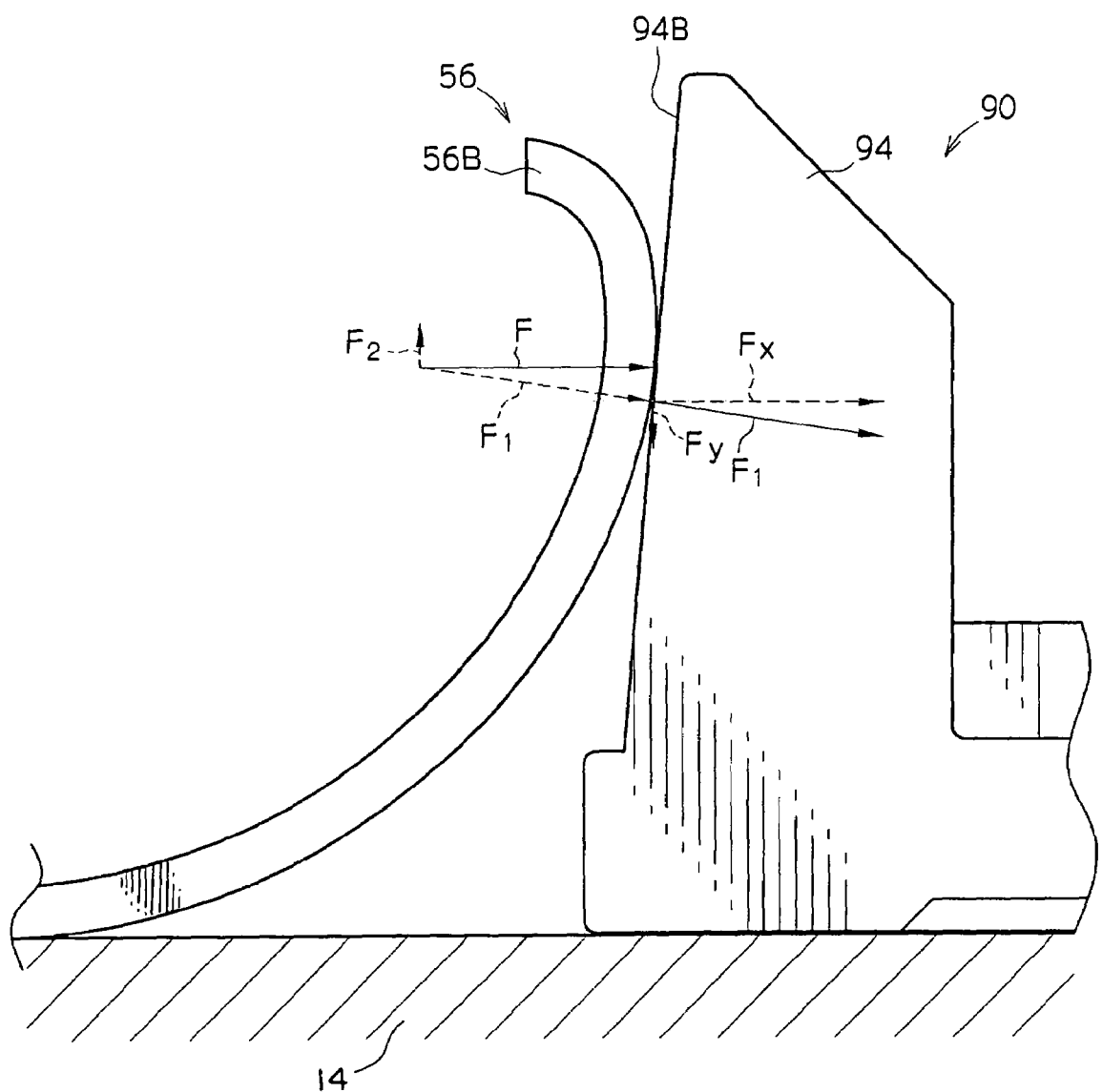
FIG. 13 is an explanatory diagram showing the relationship between a plate spring and the locking member structuring the recording tape cartridge relating to the embodiment of the present invention.

Namely, as shown in FIG. 13, in the state in which the leg piece 56B of the plate spring 56 abuts the inclined surface 94B of the cam portion 94 of the locking member 90, a pushing force F of the plate spring 56 acts on the locking member 90. However, when this pushing force F is broken down into a force which acts in the horizontal direction and a force which acts in the vertical direction with respect to the inclined surface 94B (so-called components of force), the pushing force F is reduced to a component of force F1 acting in the horizontal direction and a component of force F2 acting in the vertical direction.

The component of force F2 is force which acts along the inclined surface 94B. Therefore, the component of force F2 is considered to not affect the locking member 90 in any way. On the other hand, the component of force F1 is broken down into forces which work in a horizontal direction Fx or a vertical direction Fy with respect to the locking member 90. The force in the vertical direction Fy is force pushing the locking member 90 toward the upper case 14, and the locking member 90 does not move away from the upper case 14.

Next, description will be given of a modified example of a case in which, rather than the plate spring 56, a coil spring 58 is used as the urging means which urges the locking member. Note that parts and structures which are equivalent to those described above are denoted by the same reference numerals, and description thereof is omitted. Further, the coil spring 58 is provided for each locking member. Accordingly, in this case, three of the coil springs 58 are provided.

Figure 14:
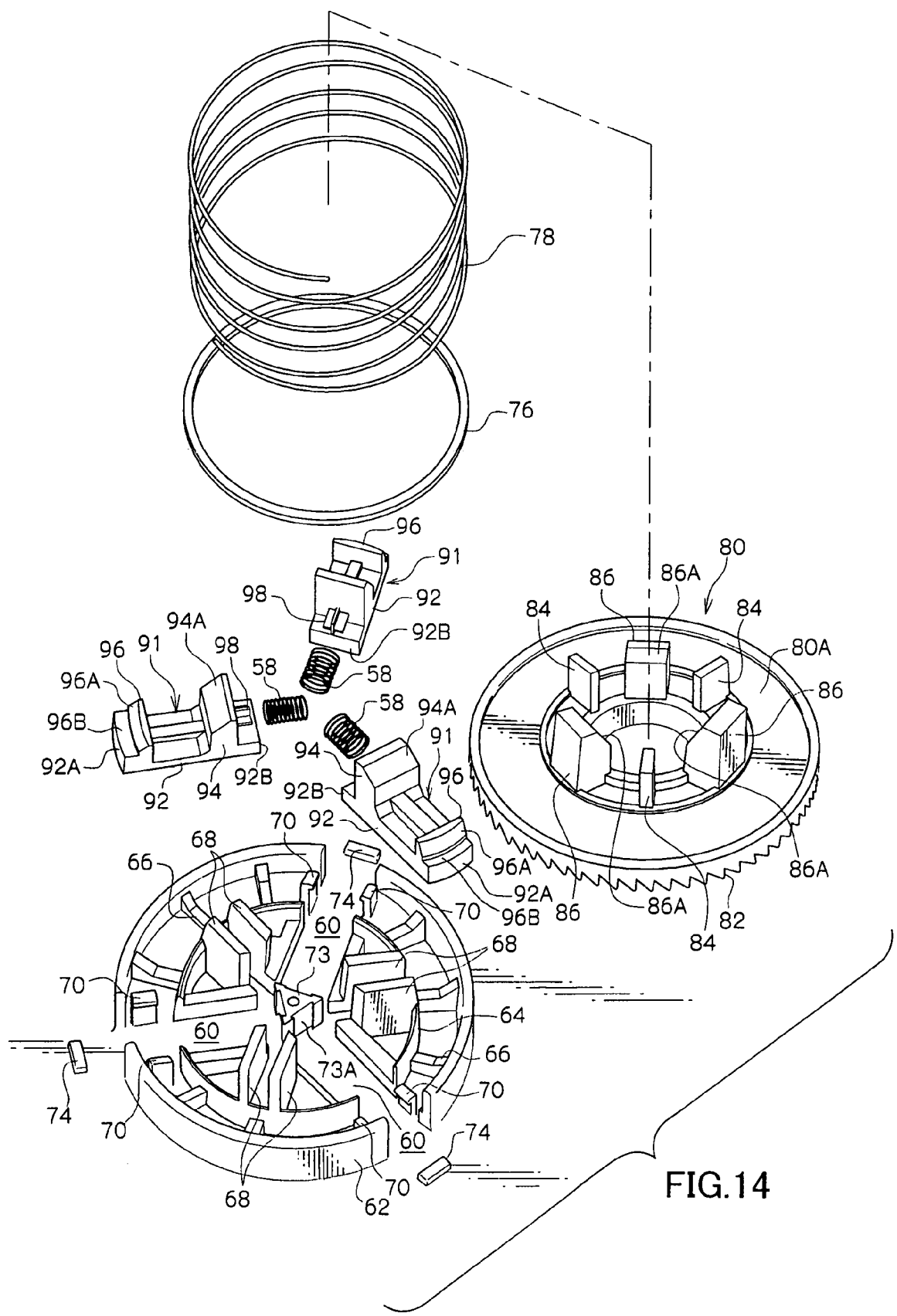
FIG. 14 is an exploded perspective view showing the braking member, a modified example of parts mounted within the part mounting portion, and the like of the recording tape cartridge relating to the embodiment of the present invention.
Figure 15:
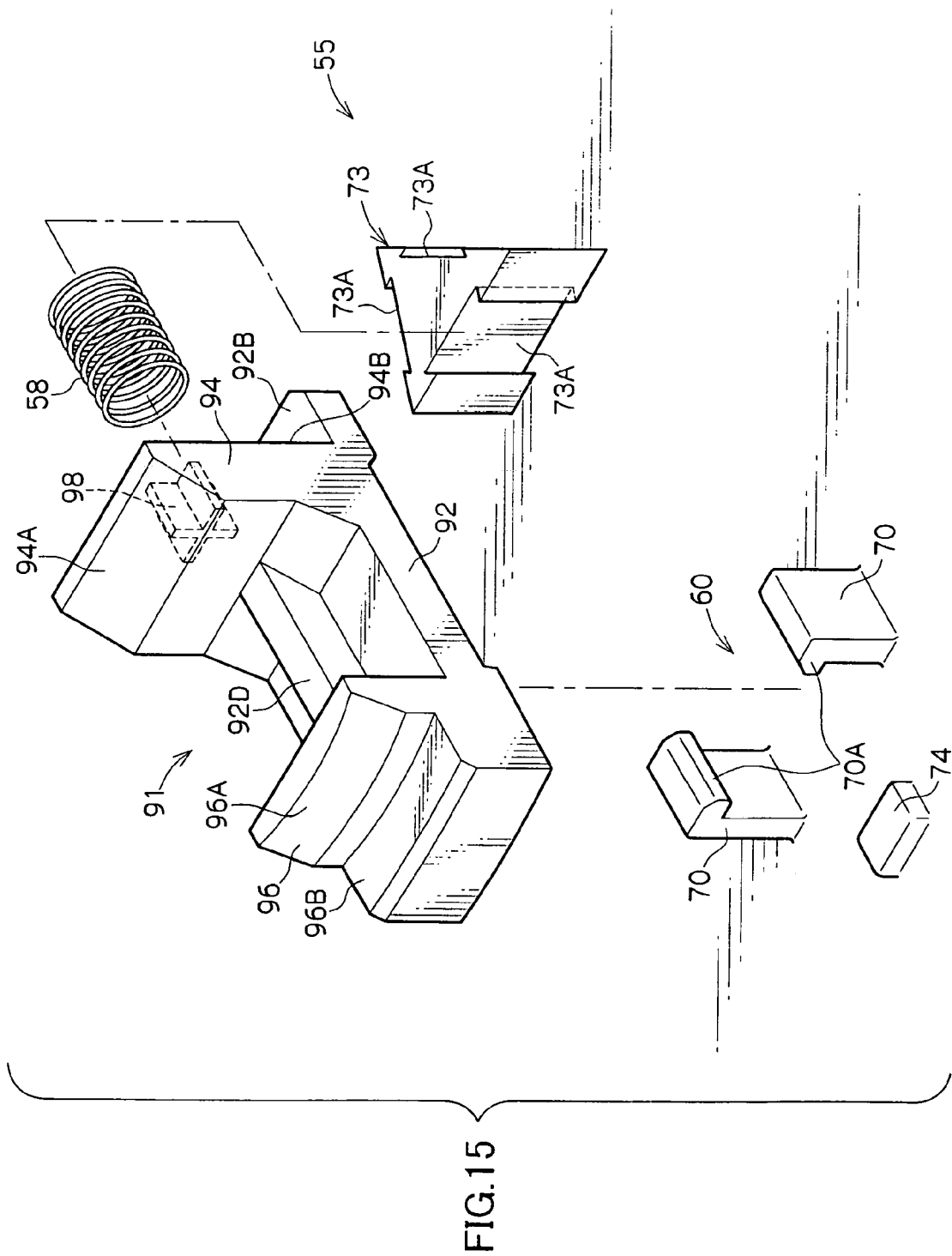
FIG. 15 is an exploded perspective view of main portions of FIG. 14.
Figure 16:
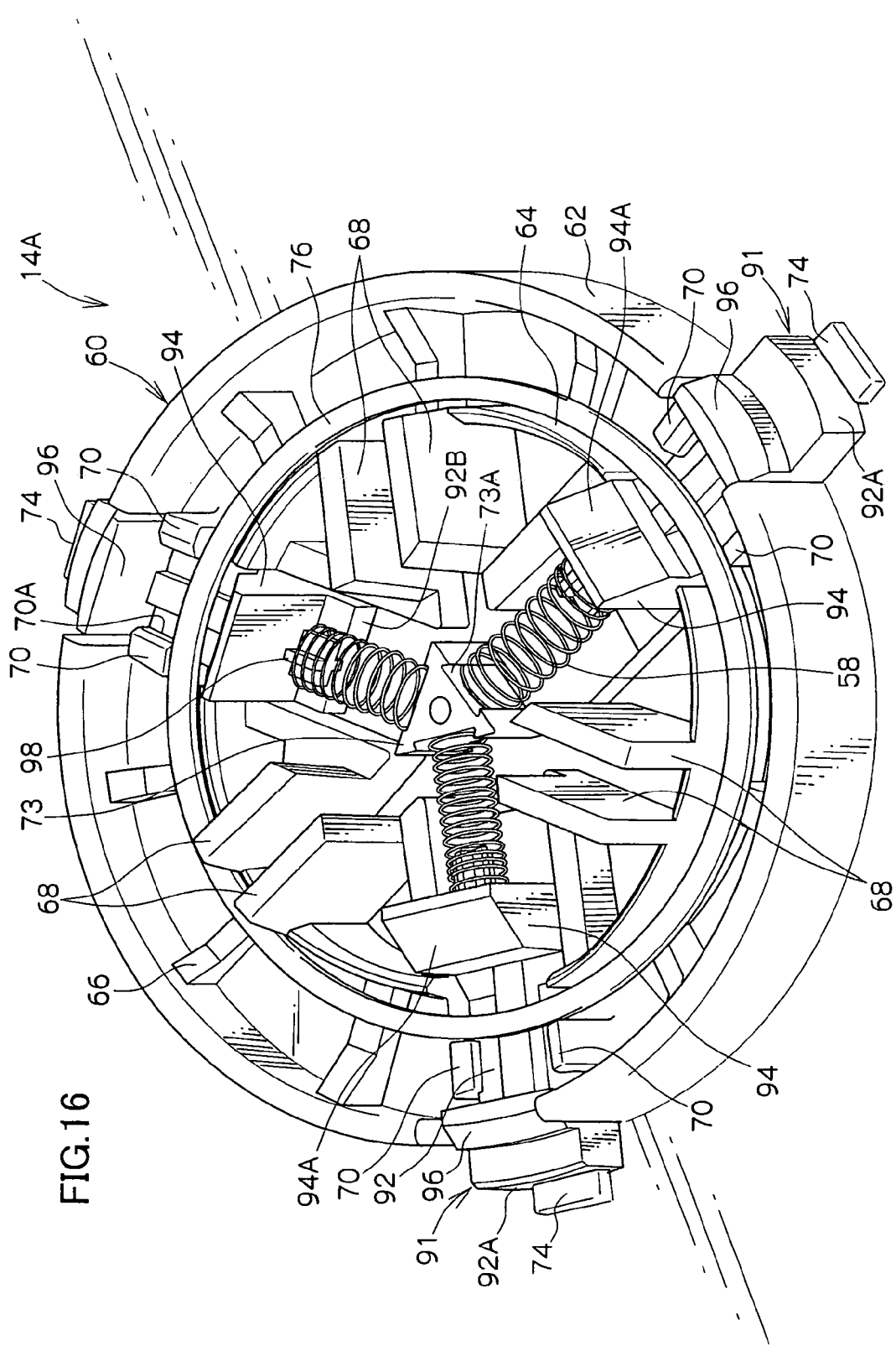
FIG. 16 is a perspective view showing a state in which the respective parts of FIG. 14 are mounted in the part mounting portion.

As shown in FIGS. 14 and 15, an outer surface of the cam portion 94 of a locking member 91 is a surface which is perpendicular with respect to the case 14. A fit-in portion 98, which has a substantially cross-shaped cross-section, projects out from the outer surface of the cam portion 94 along the longitudinal direction of the locking member 91. The fit-in portion 98 is fit-in one end portion of the coil spring 58. A straight portion 92B, which juts out from the main body portion 92, is provided beneath the fit-in portion 98. The straight portion 92B supports the one end portion side of the coil spring 58 which is attached to the fit-in portion 98 (as will be described later).

On the other hand, a substantially triangular-columnar anchor projection 73 projects at the central portion of the part mounting portion 55. A groove portion 73A is formed concavely in each side surface of the anchor projection 73 along the entire height thereof. The width of the groove portion 73A is greater deeper-in than at the entrance side thereof. In the state in which the one end portion of the coil spring 58 is attached to the fit-in portion 98, the other end portion of the coil spring 58 is made to engage with the groove portion 73A. Because the width of the entrance side of the groove portion 73A is more narrow than the width at the deep side thereof, the other end portion of the coil spring 58 cannot easily get out of place with respect to the horizontal direction.

Figure 17A:
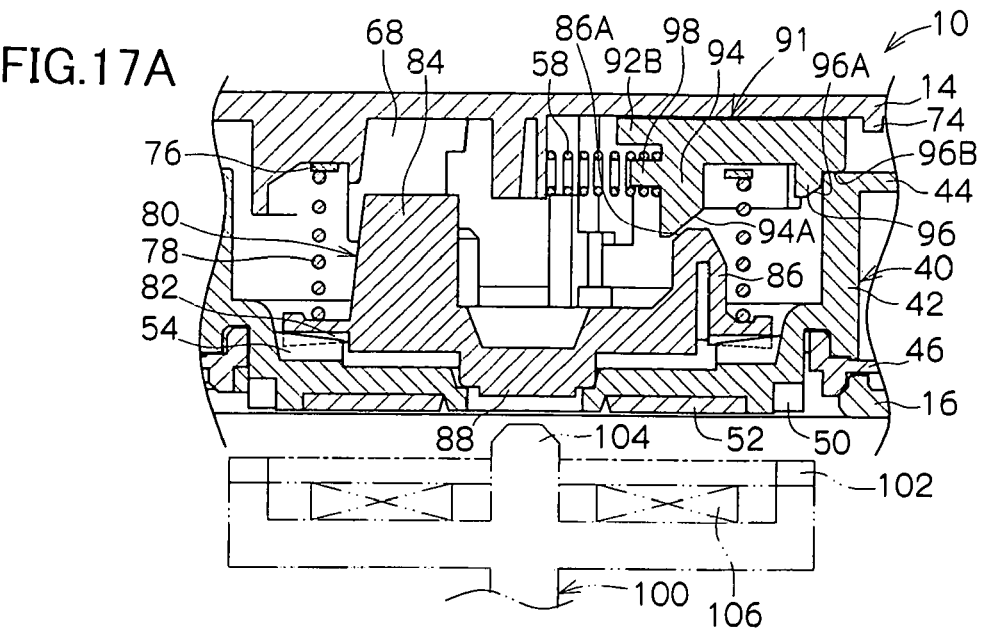
FIGS. 17A through 17C are operational diagrams showing the modified example of the recording tape cartridge relating to the embodiment of the present invention.
Figure 17B:
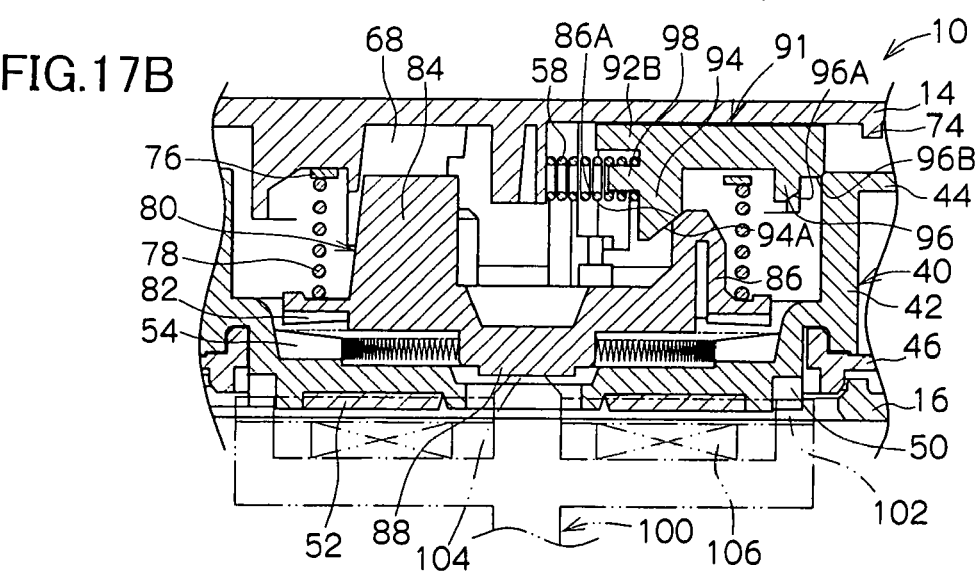
Figure 17C:
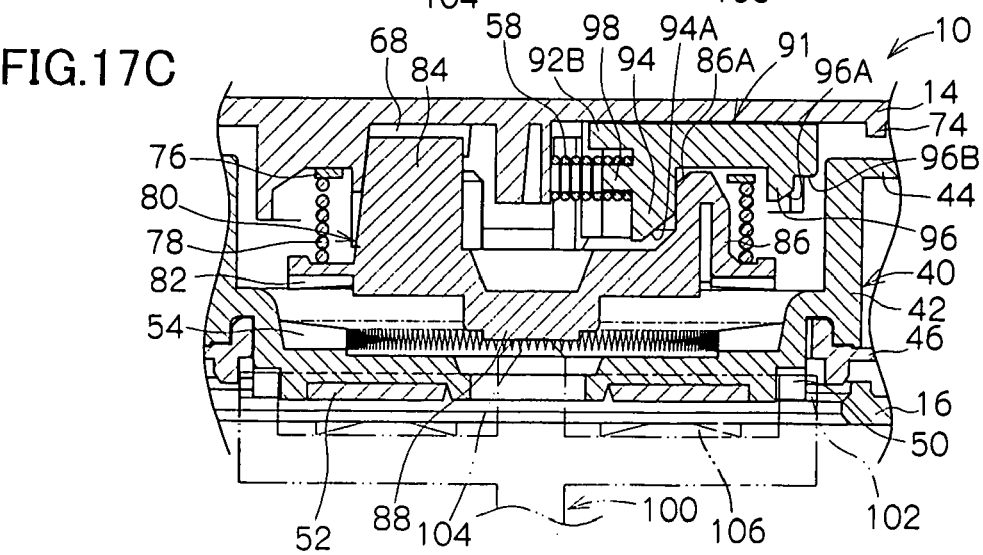

As shown in FIG. 17B, when the releasing projection 104 abuts the operation projection 88, and the braking member 80 rises by a predetermined height against the urging force of the compression coil spring 78, and the abutment surfaces 86A of the engaging projections 86 abut the abutment surfaces 94A of the cam portions 94 of the locking members 91, the pushing force along the axial direction of the reel 40 is borne by the abutment surfaces 94A of the cam portions 94.

On the other hand, as shown in FIG. 18, if the straight portion 92B does not jut out from the main body portion 92 of the locking member 91 (as shown by the virtual line), the cam portion 94 is positioned at one longitudinal direction end side of the locking member 91. Therefore, in the state in which the cam portion 94 is pushed by the engaging projection 86, a rotational moment M acts on corner portion P of the locking member 91.

However, due to the straight portion 92B jutting out from the from the main body portion 92 of the locking member 91, a rotational moment M1 that opposes the rotational moment M (M1=M) can be obtained from the upper case 14. In this way, force which always urges the locking member 91 toward the upper case 14 can be applied, tilting of the locking member 91 can be prevented, and the locking member 91 can be made to not move away from the upper case 14.

Therefore, it is possible to prevent the coil springs 58 and the locking members 91 from flying out at the time of assembling in the coil springs 58 and the locking members 91. Further, by making the straight portions 92B jut out from the main body portions 92 of the locking members 91, the centers of gravity of the locking members 91 can be made to be at the reverse surface sides (the case 14 sides) of the locking members 91, and the feeling of stability of the locking members 91 can be aimed for.

In accordance with such a structure, by using the coil springs 58 instead of the plate spring 56, because the part unit price of the coil spring 58 is much cheaper than that of the plate spring 56, costs can be reduced even though the workability deteriorates slightly.

Here, description has been given by using the plate spring 56 or the coil springs 58. However, it suffices to be able to urge the locking members 90 or the locking members 91. Therefore, the present invention is not limited to these springs, and a torsion spring or the like may be used.

Figure 20:
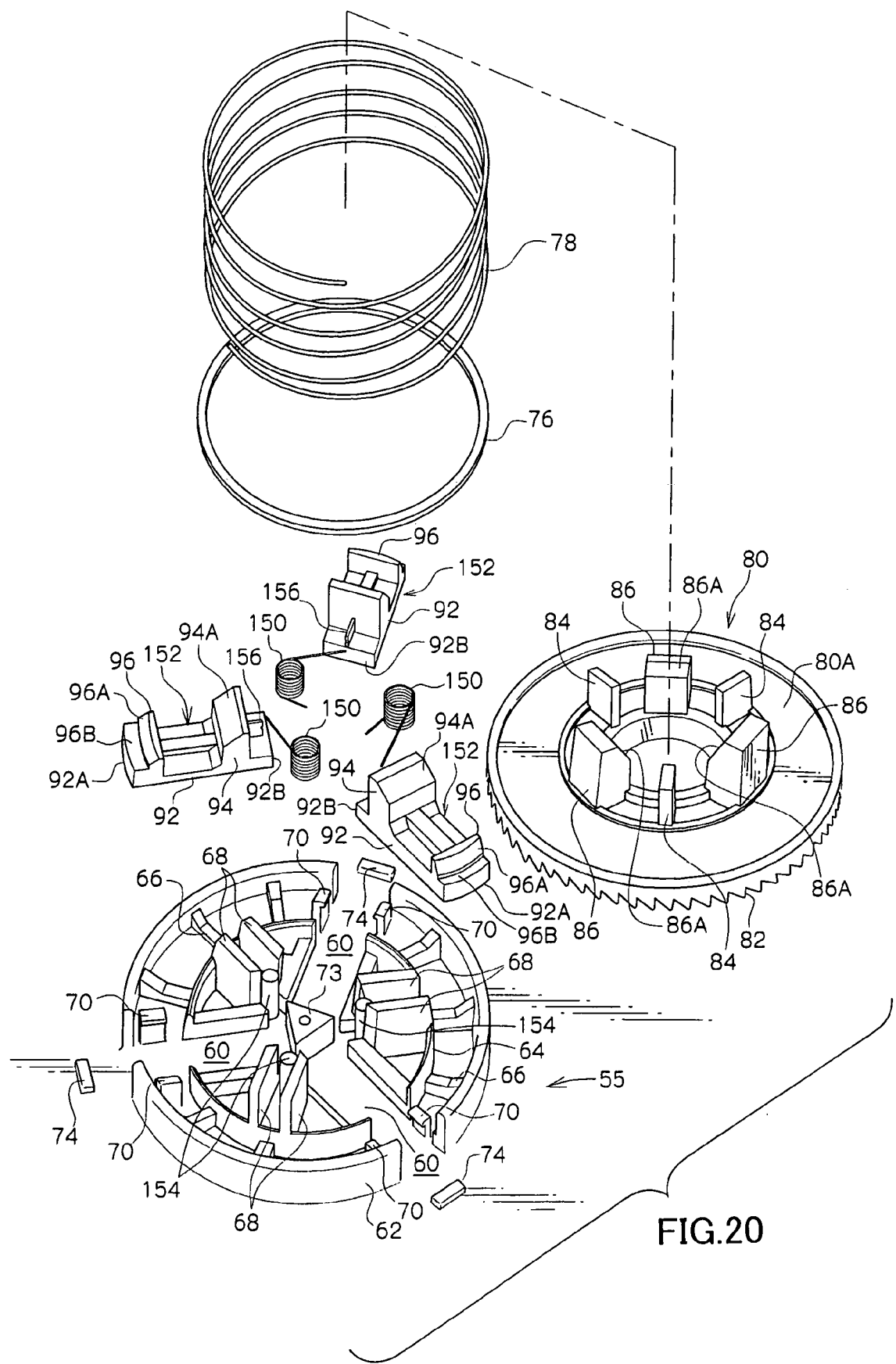
FIG. 20 is an exploded perspective view showing the braking member, yet another modified example of parts mounted in the part mounting portion, and the like of the recording tape cartridge relating to the embodiment of the present invention.
Figure 21:
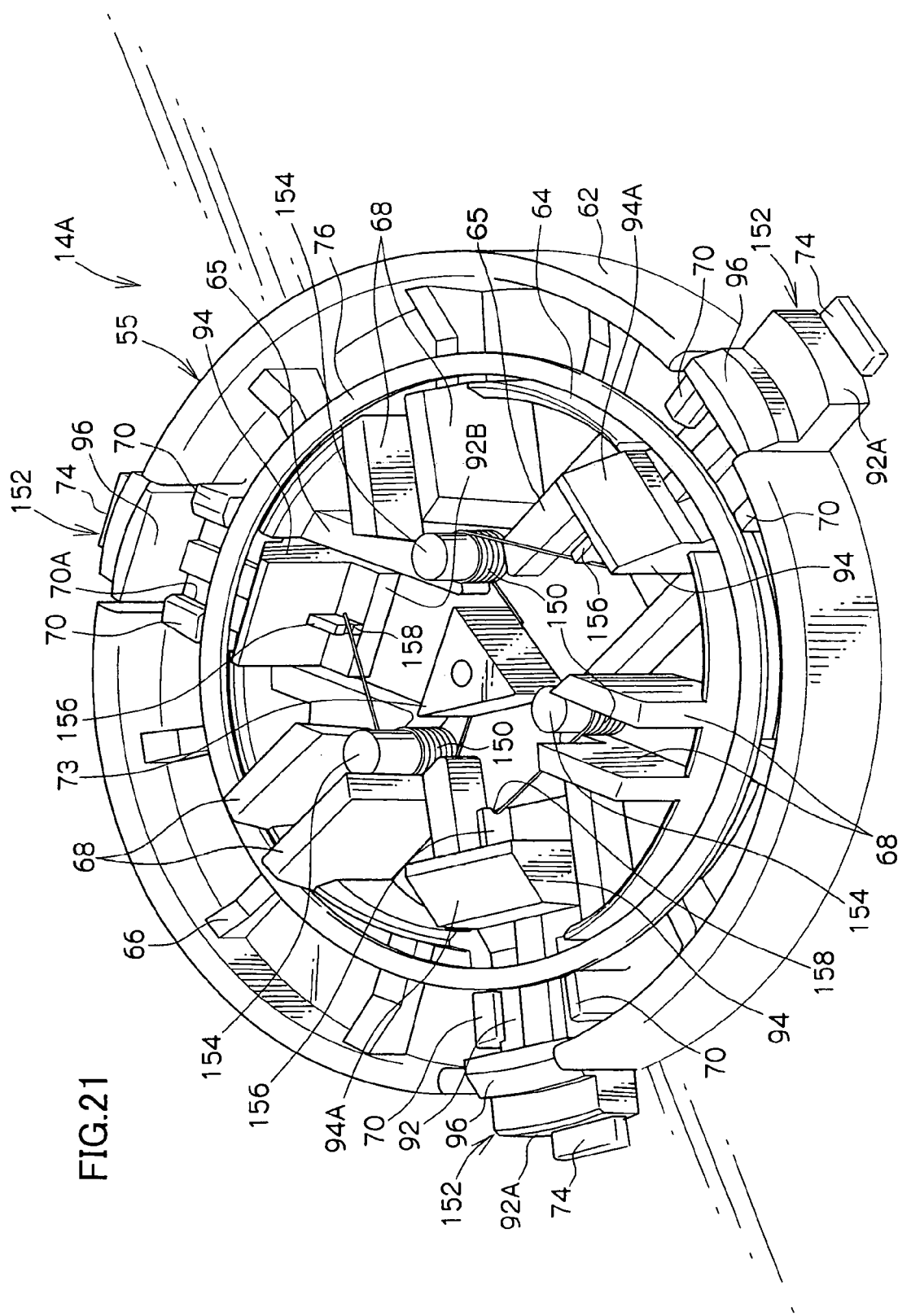
FIG. 21 is a perspective view showing a state in which the respective parts of FIG. 20 are mounted to the part mounting portion.

For example, as shown in FIGS. 20 and 21, respective one end portions of torsion springs 150 abut the anchor projection 73, and the other end portions of the torsion springs 150 abut locking members 152. The locking members 152 are urged toward the axial direction outer side of the reel 40 by the torsion springs 150.

Here, attachment bosses 154, which are shorter than the guide wall portions 68, are provided in vicinities of the distal end portions of the pairs of guide wall portions 68 of the part mounting portion 55. The axially central portions of the torsion springs 150 are attached to these attachment bosses 154. Further, because the one end portions of the torsion springs 150 are made to abut the anchor projection 73 of the part mounting portion 55, there is no need to form the groove portions 73A (see FIG. 14) in the anchor projection 73.

On the other hand, at the locking member 152, in place of the fit-in portion 98 of the locking member 91 shown in FIG. 14, an attachment rib 156 stands erect at the straight portion 92B. A cut-out portion 158 is formed in the side of the attachment rib 156 which side faces the anchor projection 73. The other end portion of the torsion spring 150 is anchored thereat.

In this way, even if the locking member 152 is moved, the other end portion of the torsion spring 150 does not come off from the locking member 152, and the movement of the locking member 152 can be stabilized.

In the present embodiment, as shown in FIG. 7, the leg pieces 56B of the plate spring 56 are curved so as to delineate large arcs from the base portion 56A to the distal end portions of the leg pieces 56B. However, the leg pieces 56B do not have to be curved, and may be formed by straight portions from the proximal portions of the leg pieces to the distal end portions thereof, although such a structure is not illustrated.

Figure 22:
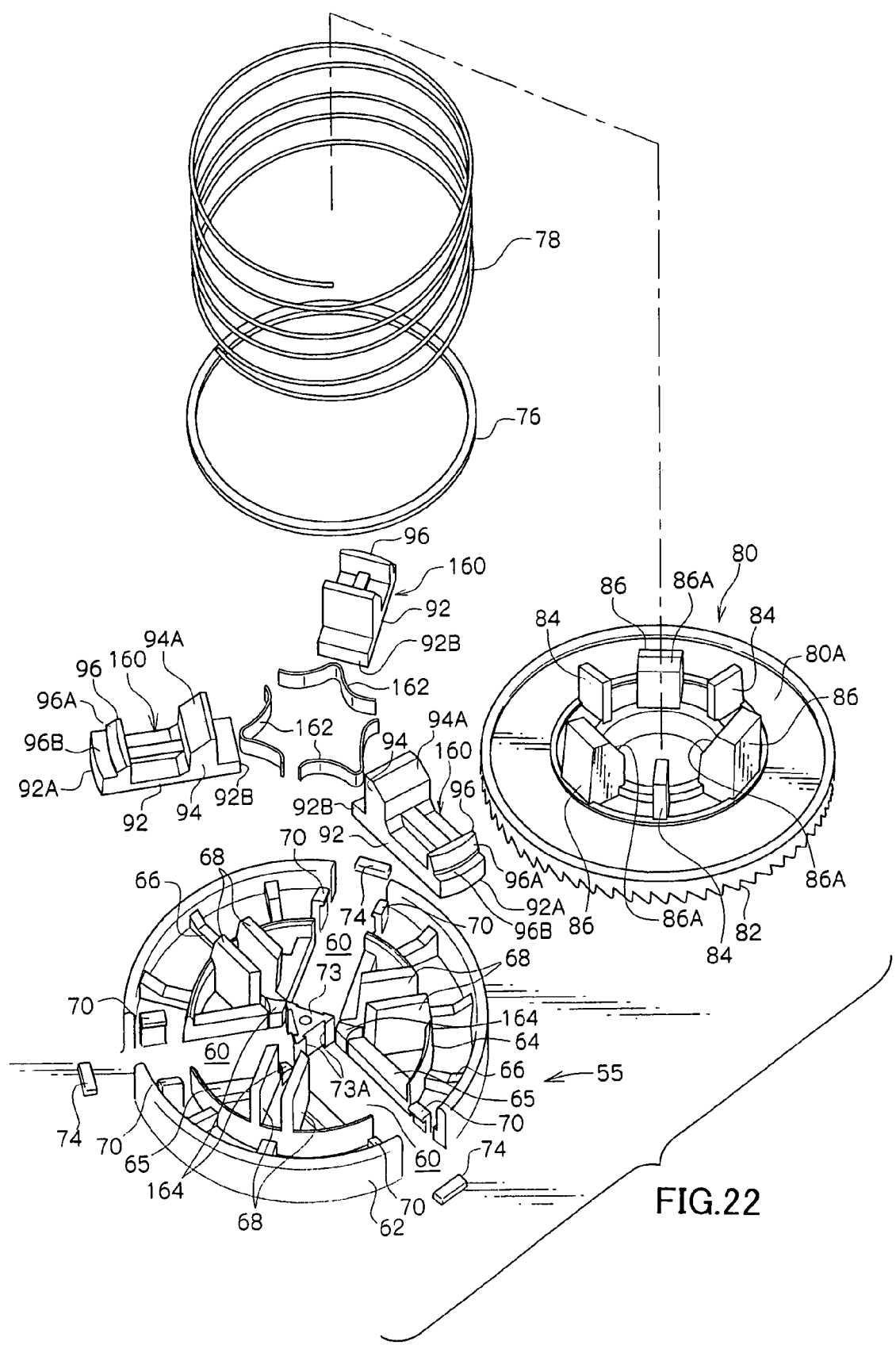
FIG. 22 is an exploded perspective view showing the braking member, still yet another modified example of parts mounted in the part mounting portion, and the like of the recording tape cartridge relating to the embodiment of the present invention.
Figure 23:
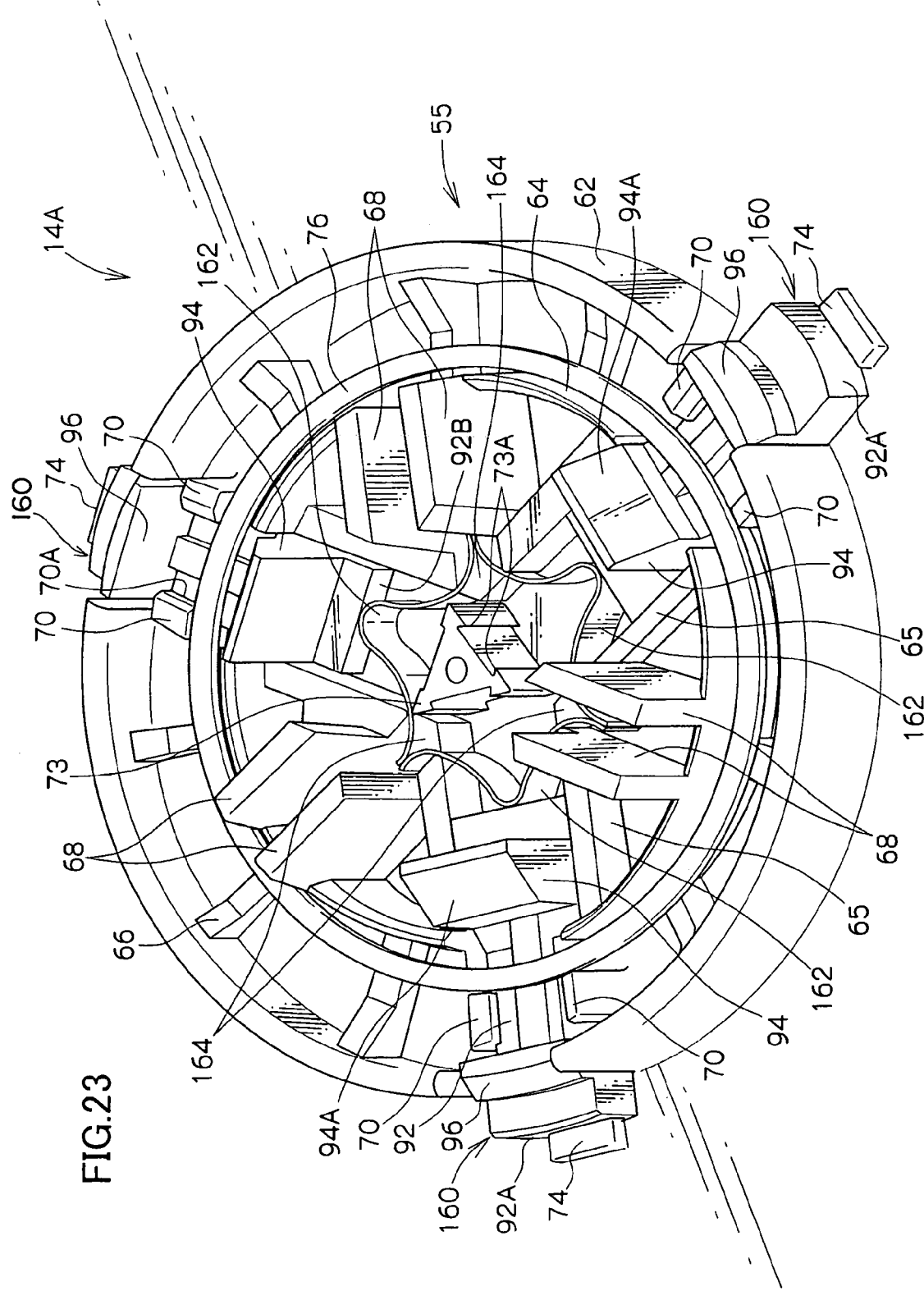
FIG. 23 is a perspective view showing a state in which the respective parts of FIG. 22 are mounted in the part mounting portion.
Figure 24:
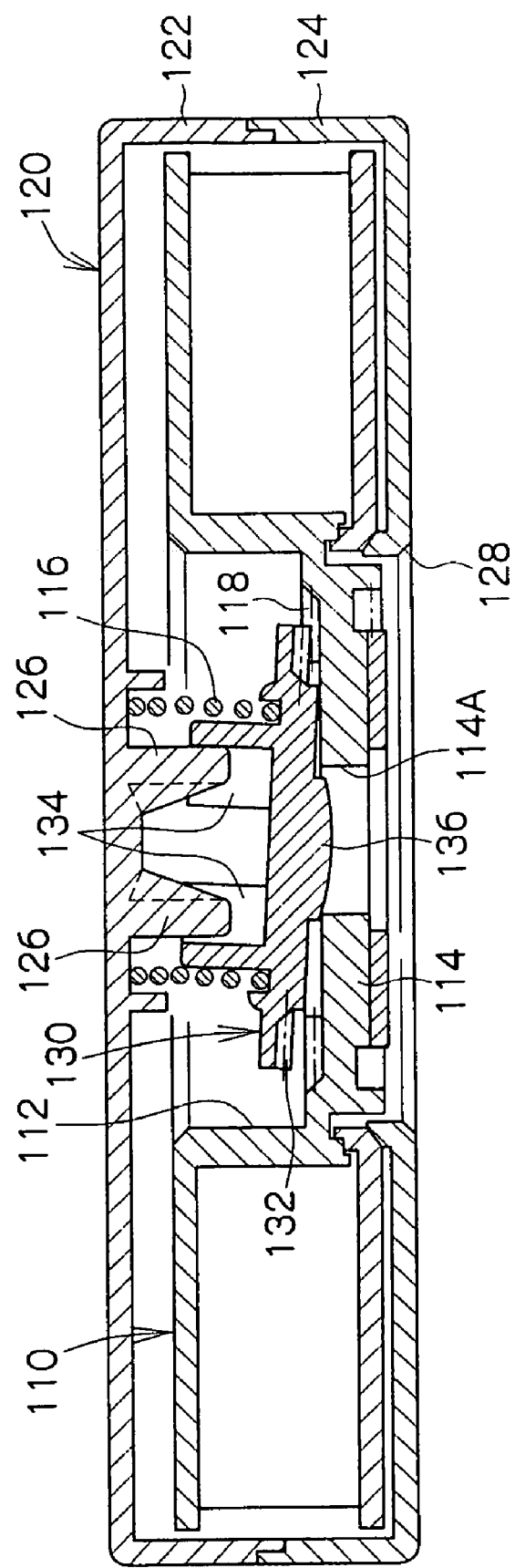
FIG. 24 is a sectional view showing a conventional recording tape cartridge.

Moreover, the structure itself of the plate spring 56 may be changed. For example, as shown in FIGS. 22 and 23, a plate spring 162 may be provided for each locking member 160.

Here, the plate spring 162 is formed in a substantial V shape, and the both end portions thereof are set in the same plane and are oriented in directions of moving away from one another. On the other hand, anchor bosses 164, which are shorter than the guide wall portions 68, stand erect in vicinities of the distal end portions of the pairs of guide wall portions 68 of the part mounting portion 55. The anchor bosses 164 are formed such that gaps, which are slightly wider than the plate thickness of the plate springs 162, are provided between, on the one hand, the anchor bosses 164, and, on the other hand, the distal end portions of the side walls 65 which span between the end portions of the guide wall portions 68 and the end portions of the arc-shaped walls 64. The end portions of the plate springs 162 are fit into these gaps.

At this time, the plate springs 162 are disposed such that the peak portions of the plate springs 162 are at the locking member 160 sides. In this way, the plate springs 162 abut the straight portions 92B of the locking members 160, and urge the locking members 160 toward the radial direction outer side of the reel 40.

In the present embodiment, the braking gear 82 of the braking member 80 is pushed toward the engaging gear 54 of the reel hub 42 by the compression coil spring 78. However, it suffices to be able to make the engaging gear 54 engage with the braking gear 82, and the present invention is not limited to the above-described structure.

Figure 19A:
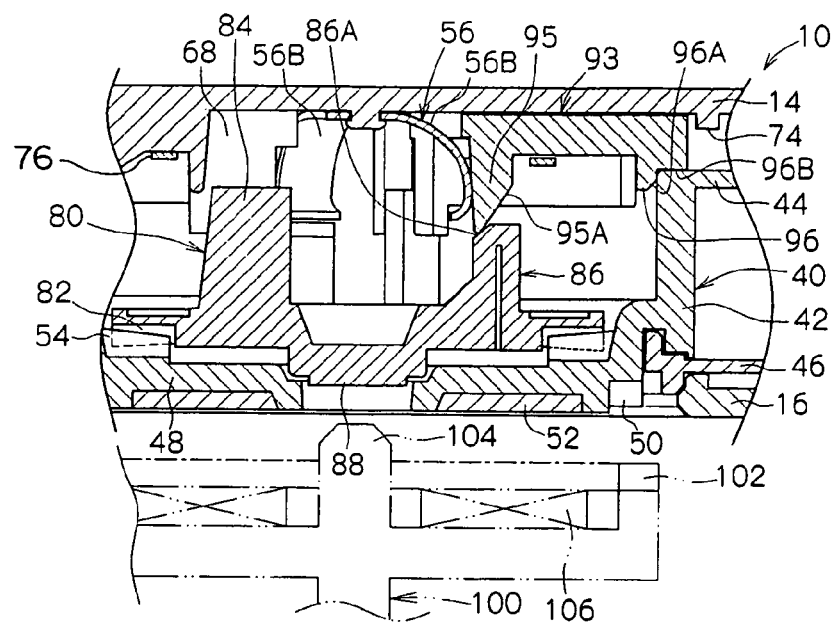
FIGS. 19A through 19C are operational diagrams showing another modified example of the recording tape cartridge relating to the embodiment of the present invention.
Figure 19B:
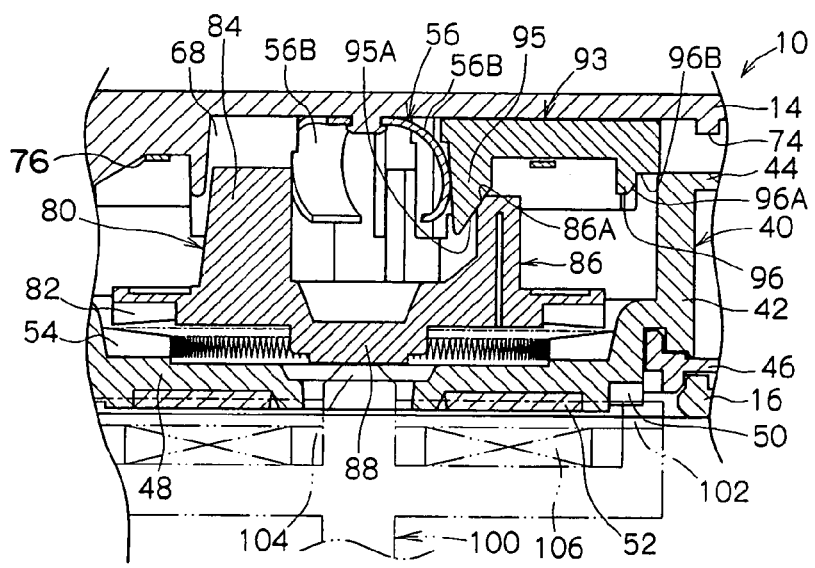
Figure 19C:
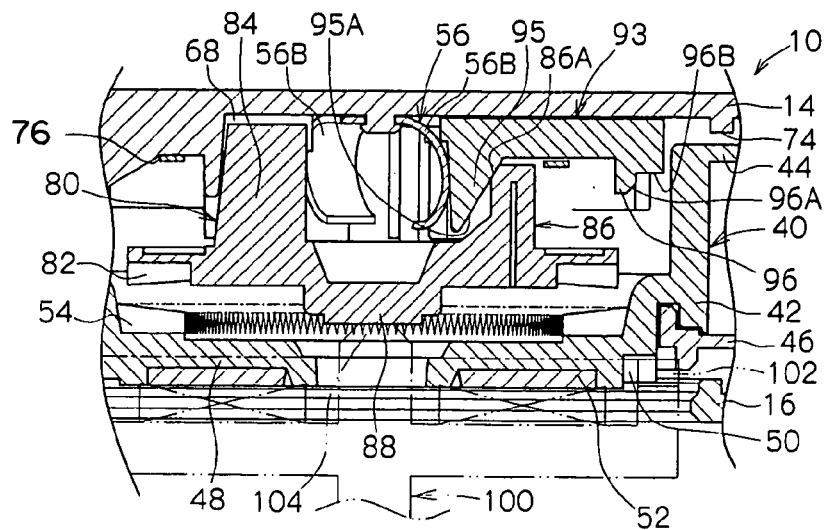

The following structure is possible, as shown in FIGS. 19A through 19C: the angles of inclination of abutment surfaces 95A of cam portions 95 of locking members 93 are changed. In a state in which the braking member 80 cannot rotate with respect to the case 12 (see FIG. 19A), the abutment surfaces 95A of the cam portions 95 and the abutment surfaces 86A of the engaging projections 86 of the braking member 80 abut one another. Due to the urging force of the plate spring 56, a component of force which pushes the braking gear 82 toward the engaging gear 54 is applied. The compression coil spring 78 can thereby be rendered unnecessary. In this way, the number of parts can be reduced, and costs can be reduced.

Further, the above-described embodiment is structured such that the reel 40 is disposed at the substantially central portion of the case 12. However, the reel 40 does not have to be disposed at the central portion of the case 12.

Moreover, here, as an example, a structure is described in which the recording tape cartridge 10 has the leader tape 22. However, the present invention is not limited by the configuration of the case 12, the structure for pulling-out the magnetic tape T (the structure of the leader member), the structure for opening and closing the opening 20, and the like. Accordingly, for example, the recording tape cartridge 10 may be structured such that a small, solid cylindrical leader pin is attached as a leader member to the distal end of the magnetic tape T, or the recording tape cartridge 10 may be structured so as to have a shielding member which opens and closes the opening 20 (a sliding door which moves along a predetermined straight line or arc, or the like).

In the above-described embodiment, the engaging portion which engages with the braking member 80 is the engaging gear 54. However, it suffices to be able to restrict rotation of the reel 40, and the present invention is not limited to the same. In this case, the configuration of the braking member may, of course, be changed in accordance with the configuration of the engaging portion.

In addition, the above embodiment is structured such that the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

What is claimed is:

1. A recording tape cartridge comprising:
   a case;
   a reel rotatably accommodated in the case, a recording tape being wound around the reel, the reel having a hub and an engaging portion formed at a floor wall of the hub;
   a braking member provided so as to face the engaging portion and so as to be movable along an axial direction of the hub, the braking member being able to restrict rotation of the reel by engaging with the engaging portion, and being able to permit the rotation of the reel by canceling a state of engagement with the engaging portion;
   a part mounting portion formed at the case;
   a locking member mounted to the part mounting portion so as to be movable in a radial direction of the reel, the locking member restricting axial direction movement of the reel by being interposed between the reel and the case, and permitting movement of the reel by being pushed by the braking member and moving away from the reel; and an urging element urging the locking member in the radial direction of the reel, and interposed between the reel and the case, and restricting the axial direction movement of the reel, wherein convex and concave portions are provided at sliding surfaces of the locking member and the case.

2. The cartridge of claim 1, further comprising a stabilizing portion jutting out from a corner portion, the stabilizing portion able to generate a rotational moment which opposes a rotational moment which is generated at a corner portion of the locking member by pushing force of the braking member.

3. The cartridge of claim 1, wherein the urging element has a plate spring having a base portion fixed at a center of the part mounting portion, and a leg piece spreading radially from the base portion.

4. The cartridge of claim 3, wherein the locking member has an inclined surface which the leg piece abuts and which is for obtaining a component of force of force which pushes the locking member toward the case and which is generated by the urging force of the plate spring.

5. A recording tape cartridge comprising:

a case;

a reel rotatably accommodated in the case, a recording tape being wound around the reel, the reel having a hub and an engaging portion formed at a floor wall of the hub;

a braking member provided so as to face the engaging portion and so as to be movable along an axial direction of the hub, the braking member being able to restrict rotation of the reel by engaging with the engaging portion, and being able to permit the rotation of the reel by canceling a state of engagement with the engaging portion;

a part mounting portion formed at the case;

a locking member mounted to the part mounting portion so as to be movable in a radial direction of the reel, the locking member restricting axial direction movement of the reel by being interposed between the reel and the case, and permitting movement of the reel by being pushed by the braking member and moving away from the reel;

an urging element urging the locking member in the radial direction of the reel, and interposed between the reel and the case, and restricting the axial direction movement of the reel; and a stabilizing portion jutting out from a corner portion, the stabilizing portion able to generate a rotational moment which opposes a rotational moment which is generated at a corner portion of the locking member by pushing force of the braking member.

6. The cartridge of claim 5, wherein the urging element has a plate spring having a base portion fixed at a center of the part mounting portion, and a leg piece spreading radially from the base portion.

7. The cartridge of claim 6, wherein the locking member has an inclined surface which the leg piece abuts and which is for obtaining a component of force of force which pushes the locking member toward the case due to urging force of the plate spring.

8. A recording tape cartridge comprising:

a case;

a reel rotatably accommodated in the case, a recording tape being wound around the reel, the reel having a hub and an engaging portion formed at a floor wall of the hub;

a braking member provided so as to face the engaging portion and so as to be movable along an axial direction of the hub, the braking member being able to restrict rotation of the reel by engaging with the engaging portion, and being able to permit the rotation of the reel by canceling a state of engagement with the engaging portion;

a part mounting portion formed at the case;

a locking member mounted to the part mounting portion so as to be movable in a radial direction of the reel, the locking member restricting axial direction movement of the reel by being interposed between the reel and the case, and permitting movement of the reel by being pushed by the braking member and moving away from the reel; and an urging element urging the locking member in the radial direction of the reel, and interposed between the reel and the case, and restricting the axial direction movement of the reel, wherein the urging element has a plate spring having a base portion fixed at a center of the part mounting portion, and a leg piece spreading radially from the base portion.

9. A recording tape cartridge comprising:

a case;

a reel rotatably accommodated in the case, a recording tape being wound around the reel, the reel having a hub and an engaging portion formed at a floor wall of the hub;

a braking member provided so as to face the engaging portion and so as to be movable along an axial direction of the hub, the braking member being able to restrict rotation of the reel by engaging with the engaging portion, and being able to permit the rotation of the reel by canceling a state of engagement with the engaging portion;

a part mounting portion formed at the case;

a locking member mounted to the part mounting portion so as to be movable in a radial direction of the reel, the locking member restricting axial direction movement of the reel by being interposed between the reel and the case, and permitting movement of the reel by being pushed by the braking member and moving away from the reel; and an urging element urging the locking member in the radial direction of the reel, and interposed between the reel and the case, and restricting the axial direction movement of the reel, wherein the urging element has a plate spring having a base portion fixed at a center of the part mounting portion, and a leg piece spreading radially from the base portion, wherein the locking member has an inclined surface which the leg piece abuts and which is for obtaining a component of force of force which pushes the locking member toward the case and which is generated by the urging force of the plate spring.

10. A plate spring machined so as to comprise:

a plurality of leg pieces; and a joining portion joining the leg pieces at a center, and causing the leg pieces to extend radially.

* * * * *